(12) United States Patent
Fukaya et al.

(10) Patent No.: US 11,709,399 B2
(45) Date of Patent: Jul. 25, 2023

(54) LIQUID CRYSTAL DISPLAY DEVICE

(71) Applicant: Sharp Display Technology Corporation, Kameyama (JP)

(72) Inventors: Tetsuo Fukaya, Kameyama (JP); Mitsuru Chida, Kameyama (JP); Yoshito Hashimoto, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/078,042

(22) Filed: Dec. 8, 2022

(65) Prior Publication Data
US 2023/0194935 A1    Jun. 22, 2023

(30) Foreign Application Priority Data

Dec. 16, 2021   (JP) ................. 2021-204301

(51) Int. Cl.
 *G02F 1/1343*   (2006.01)
(52) U.S. Cl.
 CPC .............................. *G02F 1/134372* (2021.01)
(58) Field of Classification Search
 None
 See application file for complete search history.

(56) References Cited

U.S. PATENT DOCUMENTS

| | | |
|---|---|---|
| 2004/0027525 A1 | 2/2004 | Itakura et al. |
| 2009/0207362 A1 | 8/2009 | Nagano et al. |
| 2016/0370664 A1 | 12/2016 | Fukaya et al. |

FOREIGN PATENT DOCUMENTS

| | | |
|---|---|---|
| JP | 2006-058908 A | 3/2006 |
| JP | 2009-192932 A | 8/2009 |
| WO | 2015/087585 A1 | 6/2015 |

*Primary Examiner* — Phu Vu
(74) *Attorney, Agent, or Firm* — ScienBiziP, P.C.

(57) ABSTRACT

Provided is a liquid crystal display device including a first and second sub-pixels and including a first and second substrates. The first substrate includes a common electrode, an interlayer insulating film, and a first and second sub-pixel electrodes. The first and second sub-pixel electrodes each include linear electrode portions at an edge area and a linear electrode portion at a central area. The interlayer insulating film includes a region overlapping the linear electrode portions at the edge area and a region overlapping the linear electrode portion at the central area for each sub-pixel and the regions are different in at least one of a film thickness or a relative permittivity. An electric field strength between the common electrode and the linear electrode portions at the edge area is lower than an electric field strength between the common electrode and the linear electrode portion at the central area.

8 Claims, 19 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2021-204301 filed on Dec. 16, 2021, the contents of which are incorporated herein by reference in their entirety.

BACKGROUND OF THE INVENTION

Field of the Invention

The following disclosure relates to liquid crystal display devices.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

A display mode of a liquid crystal display device having attracted the attention is a horizontal alignment mode that controls the alignment of liquid crystal molecules by rotating the liquid crystal molecules mainly in the plane parallel to the substrate surfaces because, for example, this display mode can easily provide wide viewing angle characteristics. For example, current liquid crystal display devices for smartphones or tablets commonly use a type of the horizontal alignment mode, such as an in-plane switching (IPS) mode or a fringe field switching (FFS) mode.

For example, JP 2006-58908 A discloses an IPS mode liquid crystal display device as a horizontal alignment mode liquid crystal display device, wherein scanning lines and a common electrode line are provided in the same layer and in parallel to each other, data lines and the scanning lines are covered with a common electrode with an interlayer insulating film in between, only a single common electrode line is provided on one side of the scanning lines, and the interlayer insulating film is a laminate of an organic film and an inorganic film and is provided on the scanning lines, on the data lines, on the common electrode line, and on thin film transistors, as well as near above the scanning lines, near above the data lines, near above the common electrode line, and near above the thin film transistors.

JP 2009-192932 A discloses a FFS mode liquid crystal display device including a TFT array substrate including TFTs, a counter substrate placed opposite to the TFT array substrate, and liquid crystal filled therebetween, and including, on the TFT array substrate, a pixel electrode placed at least partly directly over or under a drain electrode of the corresponding TFT so as to directly overlap the drain electrode, an interlayer insulating film covering the pixel electrode, and a counter electrode placed on the interlayer insulating film and having a slit to generate a fringe electric field with the pixel electrode.

WO 2015/087585 discloses a FFS mode liquid crystal display device including a first substrate, a second substrate facing the first substrate, and a liquid crystal layer sandwiched between the first substrate and the second substrate, wherein the first substrate includes, in order, a plurality of pixel electrodes, an insulating film covering the plurality of pixel electrodes, and a common electrode layered over the plurality of pixel electrodes and having a plurality of parallel slits formed therein, wherein a step that protrudes towards the liquid crystal layer is formed in the first substrate in at least sides of regions between the plurality of pixel electrodes that are parallel to a lengthwise direction of the plurality of parallel slits, and wherein the common electrode covers at least a side face of the step.

BRIEF SUMMARY OF THE INVENTION

FFS mode liquid crystal display devices have two modes which are different in the arrangement of a common electrode and sub-pixel electrodes. One mode is a V2 mode in which the structure includes a planar common electrode, an insulating film provided on the common electrode, and a plurality of sub-pixel electrodes that are provided for respective sub-pixels on the insulating film and that are provided with slits. The other mode is a V3 mode in which the structure incudes a plurality of planar sub-pixel electrodes provided for respective sub-pixels, an insulating film provided on the plurality of sub-pixel electrodes, and a common electrode with slits provided on the insulating film.

FIG. 26 is a graph of the results of measuring the flicker after a conventional FFS V2 mode liquid crystal display device displays a solid white image for a long period of time. The present inventors performed studies to find that the flicker of the conventional FFS V2 mode liquid crystal display device measured after long-term display of a solid white image at high temperature (e.g., 60° C.) showed a significant worsening as shown in FIG. 26, where a W-shaped curve (W-curve) became a V-shaped curve (V-curve).

The aforementioned patent documents include no examination on reduction in worsening of flicker after long-term display of a solid white image.

The present invention has been made under the current situation in the art, and aims to provide a liquid crystal display device capable of reducing worsening of flicker after long-term display of a solid white display.

FIG. 27 is a graph of the results of measuring the flicker for the entire sub-pixel and the results of estimating the flicker at a sub-pixel central area and a sub-pixel edge area after a conventional FFS V2 mode liquid crystal display device displays a solid white image for a long period of time. Specifically, for each of the sub-pixel central area and the sub-pixel edge area, an optical microscope is used to search the common voltage Vcom at which the change in luminance becomes the smallest, which is defined as the optimal Vcom value, and the difference between the optimal Vcom values is used to estimate the flicker for each of the sub-pixel central area and the sub-pixel edge area based on the flicker characteristics before aging. The results are shown in FIG. 27.

In order to examine the worsening of flicker after a conventional FFS mode liquid crystal display device displays a solid white image for a long period of time, the present inventors analyzed a sub-pixel of a conventional FFS V2 mode liquid crystal display device after long-term display of a solid white image. As shown in FIG. 27, the analysis demonstrates that the sub-pixel central area and the sub-pixel edge area have different optimal common voltage Vcom values (hereinafter, also referred to as "optimal Vcom values"). The present inventors have supposed that this difference causes the worsening of flicker after long-term display of a solid white image and that the difference in optimal Vcom value between the sub-pixel central area and the sub-pixel edge area in the V2 mode structure is caused by an event such that the sub-pixel edge area is influenced by an adjacent sub-pixel to have a higher electric field strength and is operable at a lower voltage than the sub-pixel central area. The present inventors then found that reducing the difference in electric field strength between the sub-pixel edge area and the sub-pixel central area is important to reduce the worsening of flicker after long-term display of a solid white image. Thereby, the present inventors arrived at the solution to the above issue, completing the present invention.

(1) An embodiment of the present invention is directed to a liquid crystal display device including a first sub-pixel and a second sub-pixel adjacent to each other and sequentially including:

a first substrate;

a liquid crystal layer; and a second substrate, the first substrate sequentially including a planar common electrode, an interlayer insulating film, and a first sub-pixel electrode and a second sub-pixel electrode respectively provided for the first sub-pixel and the second sub-pixel, the first sub-pixel electrode and the second sub-pixel electrode each provided with slits and each including a plurality of linear electrode portions extending in a direction in which the slits extend, the plurality of linear electrode portions including linear electrode portions at a sub-pixel edge area provided at respective end portions and a linear electrode portion at a sub-pixel central area provided between the linear electrode portions at the sub-pixel edge area, the interlayer insulating film including a region overlapping the linear electrode portions at the sub-pixel edge area and a region overlapping the linear electrode portion at the sub-pixel central area for each sub-pixel, the regions being different in at least one of a film thickness or a relative permittivity, an electric field strength between the common electrode and the linear electrode portions at the sub-pixel edge area being lower than an electric field strength between the common electrode and the linear electrode portion at the sub-pixel central area.

(2) In an embodiment of the present invention, the liquid crystal display device includes the structure (1) and satisfies the following Formula 1:

$$6.4115e^{-0.244P} < Cr < 19.137e^{-0.298P} \quad \text{(Formula 1)}$$

wherein P represents a sub-pixel-to-sub-pixel distance between an end portion of the plurality of linear electrode portions of the first sub-pixel electrode close to the second sub-pixel electrode and an end portion of the plurality of linear electrode portions of the second sub-pixel electrode close to the first sub-pixel electrode; and Cr represents a ratio of a capacitance between the first sub-pixel and the second sub-pixel to a capacitance in the first sub-pixel.

(3) In an embodiment of the present invention, the liquid crystal display device includes the structure (1) or (2), and the interlayer insulating film has a film thickness H1 within the region overlapping the linear electrode portions at the sub-pixel edge area and a film thickness H2 within the region overlapping the linear electrode portion at the sub-pixel central area for each sub-pixel, and the film thickness H1 is greater than the film thickness H2.

(4) A certain embodiment of the present invention includes the structure (3), and the interlayer insulating film includes step portions each between the region having the film thickness H1 and the region having the film thickness H2 for each sub-pixel, and in a cross-sectional view, the step portions are vertical to a bottom surface of the interlayer insulating film, and the linear electrode portions at the sub-pixel edge area each define a single plane with the corresponding step portion.

(5) A certain embodiment of the present invention includes the structure (3), and the interlayer insulating film includes step portions each between the region having the film thickness H1 and the region having the film thickness H2 for each sub-pixel, and in a cross-sectional view, the step portions are diagonal to a bottom surface of the interlayer insulating film, and the linear electrode portions at the sub-pixel edge area each do not define a single plane with the corresponding step portion.

(6) A certain embodiment of the present invention includes the structure (3), and the interlayer insulating film includes step portions each between the region having the film thickness H1 and the region having the film thickness H2 for each sub-pixel, and in a cross-sectional view, the step portions are vertical to a bottom surface of the interlayer insulating film, and the linear electrode portions at the sub-pixel edge area each do not define a single plane with the corresponding step portion.

(7) A certain embodiment of the present invention includes the structure (3), and the interlayer insulating film is a first interlayer insulating film, a second interlayer insulating film is further provided on the common electrode opposite to the first interlayer insulating film, a film thickness of the second interlayer insulating film within the region overlapping the linear electrode portions at the sub-pixel edge area is smaller than a film thickness of the second interlayer insulating film within the region overlapping the linear electrode portion at the sub-pixel central area for each sub-pixel, and the linear electrode portions at the sub-pixel edge area and the linear electrode portion at the sub-pixel central area are provided on the same plane.

(8) A certain embodiment of the present invention includes the structure (1) or (2), and the interlayer insulating film includes a first dielectric insulating film within the region overlapping the linear electrode portion at the sub-pixel central area and a second dielectric insulating film within the region overlapping the linear electrode portions at the sub-pixel edge area, the second dielectric insulating film having a smaller relative permittivity than the first dielectric insulating film for each sub-pixel, and the first dielectric insulating film and the second dielectric insulating film have the same film thickness.

The present invention can provide a liquid crystal display device capable of reducing worsening of flicker after long-term display of a solid white image.

DETAILED DESCRIPTION OF THE INVENTION

The present invention is described below in more detail based on embodiments with reference to the drawings. The embodiments, however, are not intended to limit the scope of the present invention.

Definition of Terms

Herein, the term "viewing surface side" means a side closer to the screen (display surface) of a liquid crystal display device and the term "back surface side" means a side farther from the screen (display surface) of a liquid crystal display device.

Embodiment 1

Figure 1:
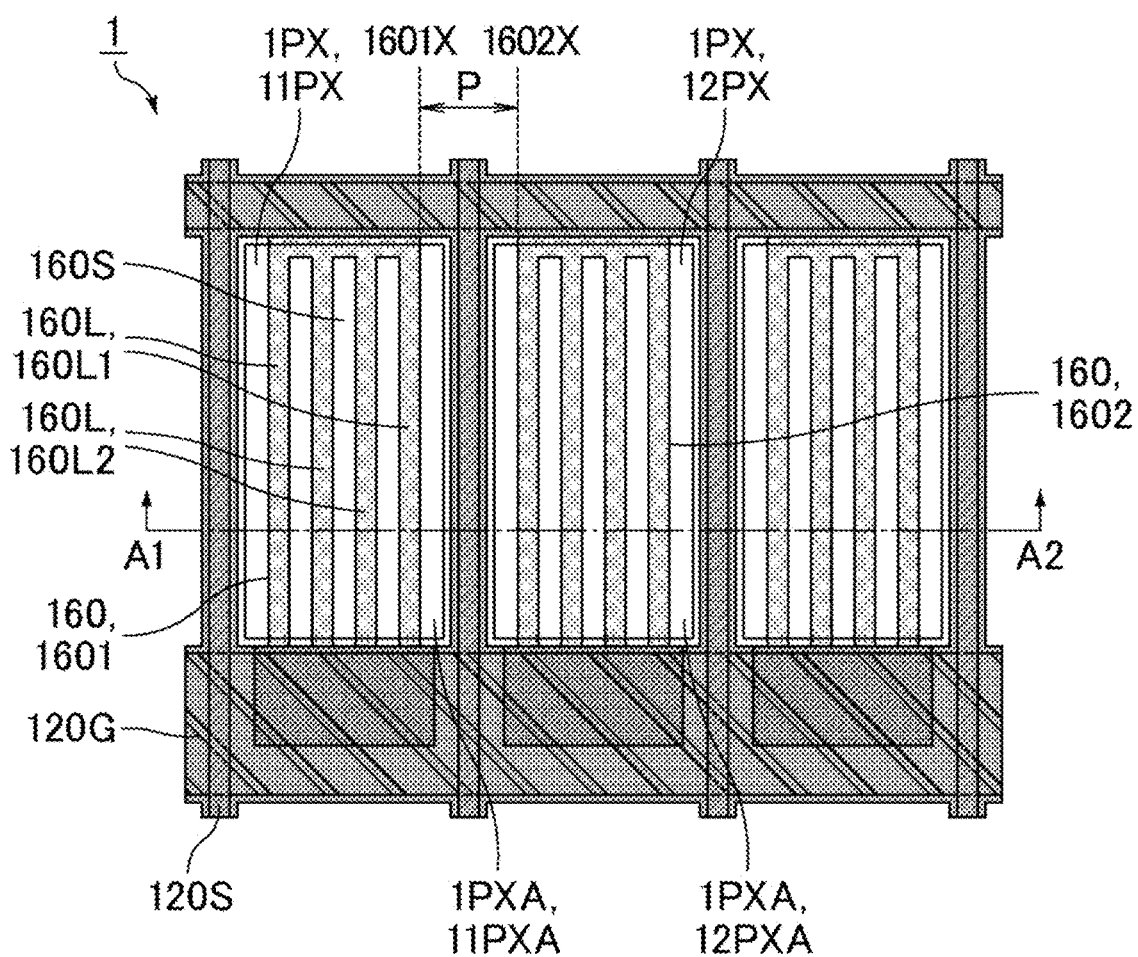
FIG. 1 is a schematic plan view of a liquid crystal display device of Embodiment 1.
Figure 2:
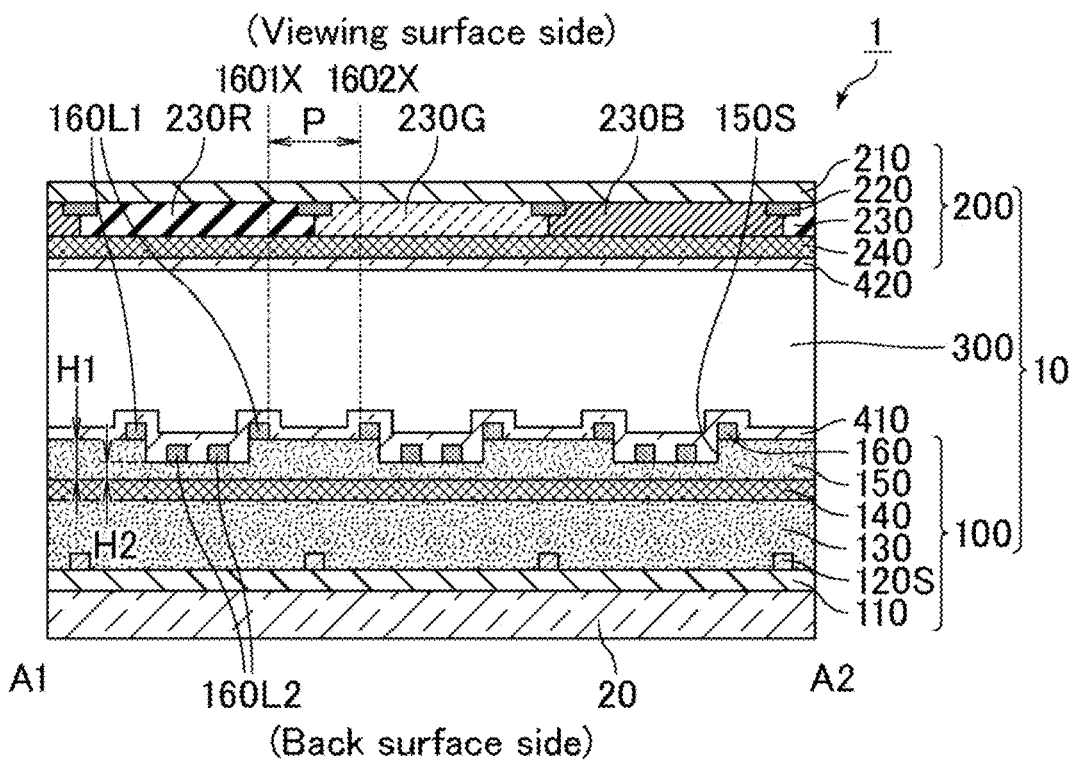
FIG. 2 is a schematic cross-sectional view of the liquid crystal display device of Embodiment 1 taken along the A1-A2 line in FIG. 1.

FIG. 1 is a schematic plan view of a liquid crystal display device of Embodiment 1. FIG. 2 is a schematic cross-sectional view of the liquid crystal display device of Embodiment 1 taken along the A1-A2 line in FIG. 1. As shown in FIG. 1 and FIG. 2, a liquid crystal display device 1 of the present embodiment includes a first sub-pixel 11PX and a second sub-pixel 12PX adjacent to each other, and sequentially includes a first substrate 100, a liquid crystal layer 300, and a second substrate 200, the first substrate 100 sequentially including a planar common electrode 140, a second insulating film 150 serving as the interlayer insulating film and the first interlayer insulating film, and a first sub-pixel electrode 1601 and a second sub-pixel electrode 1602 respectively provided for the first sub-pixel 11PX and the second sub-pixel 12PX. The first sub-pixel electrode 1601 and the second sub-pixel electrode 1602 are each also simply referred to as a sub-pixel electrode 160. The liquid crystal display device may be a gray-scale liquid crystal display device and in this case the sub-pixels may be referred to as pixels.

The first sub-pixel electrode 1601 and the second sub-pixel electrode 1602 are each provided with slits 160S and each include a plurality of linear electrode portions 160L extending in a direction in which the slits 160S extend. The plurality of linear electrode portions 160L include linear electrode portions 160L1 at a sub-pixel edge area provided at respective end portions in a horizontal direction and linear electrode portions 160L2 at a sub-pixel central area provided between the linear electrode portions 160L1 at the sub-pixel edge area.

In the liquid crystal display device 1 of the present embodiment, applying voltage between the common electrode 140 and the sub-pixel electrodes 160 generates a transverse electric field (fringe electric field) in the liquid crystal layer 300. Thus, adjusting the voltage applied between the common electrode 140 and the sub-pixel electrodes 160 enables control of the alignment of the liquid crystal molecules in the liquid crystal layer 300. The liquid crystal display device 1 of the present embodiment can provide display of the fringe field switching (FFS) mode.

In the FFS mode liquid crystal display device, the electric field strength at the sub-pixel central area is determined by the fringe electric field between the sub-pixel electrode and the common electrode. In contrast, the electric field strength at the sub-pixel edge area is determined not only by the fringe electric field between the sub-pixel electrode and the common electrode but also by the influence of a transverse electric field with an adjacent sub-pixel. Thus, in a conventional FFS V2 mode liquid crystal display device, the sub-pixel edge area has a higher electric field strength than the sub-pixel central area and suffers worsening of flicker after long-term display of a solid white image.

In contrast, in the present embodiment, the second insulating film 150 includes a region overlapping the linear electrode portions 160L1 at the sub-pixel edge area and a region overlapping the linear electrode portions 160L2 at the sub-pixel central area for each sub-pixel and the regions are different in at least one of the film thickness or the relative permittivity. The electric field strength between the common electrode 140 and the linear electrode portions 160L1 at the sub-pixel edge area is smaller than the electric field strength between the common electrode 140 and the linear electrode portions 160L2 at the sub-pixel central area for each sub-pixel. This mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image.

The expression "the second insulating film 150 includes a region overlapping the linear electrode portions 160L1 at the sub-pixel edge area and a region overlapping the linear electrode portions 160L2 at the sub-pixel central area for each sub-pixel and the regions are different in at least one of the film thickness or the relative permittivity" specifically means any of the following items (A) to (C).

(A) In the second insulating film 150, the region overlapping the linear electrode portions 160L1 at the sub-pixel edge area and the region overlapping the linear electrode portions 160L2 at the sub-pixel central area have different film thicknesses.

(B) In the second insulating film 150, the region overlapping the linear electrode portions 160L1 at the sub-pixel edge area and the region overlapping the linear electrode portions 160L2 at the sub-pixel central area have different relative permittivities.

(C) In the second insulating film 150, the region overlapping the linear electrode portions 160L1 at the sub-pixel edge area and the region overlapping the linear electrode portions 160L2 at the sub-pixel central area have different film thicknesses and the region overlapping the linear electrode portions 160L1 at the sub-pixel edge area and the region overlapping the linear electrode portions 160L2 at the sub-pixel central area have different relative permittivities.

In the present embodiment, the electric field strength between the common electrode 140 and the linear electrode portions 160L1 at the sub-pixel edge area and the electric field strength between the common electrode 140 and the linear electrode portions 160L2 at the sub-pixel central area can be set as appropriate by adjusting at least one of the film thickness or the relative permittivity of the second insulating film 150 in the region overlapping the linear electrode portions 160L1 at the sub-pixel edge area and the region overlapping the linear electrode portions 160L2 at the sub-pixel central area. Hereinafter, components of the liquid crystal display device 1 of the present embodiment are described.

As shown in FIG. 1 and FIG. 2, the liquid crystal display device 1 of the present embodiment includes a plurality of sub-pixels 1PX arranged in a matrix pattern and includes a liquid crystal panel 10 that includes, sequentially from the back surface side toward the viewing surface side, a first substrate 100, a first alignment film 410, a liquid crystal layer 300, a second alignment film 420, and a second substrate 200, and a backlight 20 provided on the back surface side of the liquid crystal panel 10. The liquid crystal panel 10 may include a first linear polarizer on the back surface side of the first substrate 100 and a second linear polarizer on the viewing surface side of the second substrate 200.

The sub-pixels 1PX are each provided with an optical aperture 1PXA that allows light to pass through the liquid crystal panel 10. The optical aperture 1PXA corresponds to a region surrounded by a thick line within each sub-pixel 1PX shown in FIG. 1. In the case of a transmissive liquid crystal panel 10, the optical aperture 1PXA transmits light emitted from the back side of the liquid crystal panel 10 toward the front surface of the liquid crystal panel 10. In the case of a reflective liquid crystal panel 10, the optical aperture 1PXA transmits incident light from the outside of the liquid crystal panel 10 and reflected light resulting from reflection of the incident light inside the liquid crystal panel 10 and emission thereof toward the outside of the liquid crystal panel 10. In a plan view, the optical aperture 1PXA may overlap transmissive components such as a polarizer and a color filter.

The first substrate 100 is a TFT substrate provided with thin-film transistors (TFTs) that are each a switching element for switching on and off a pixel of the liquid crystal display device 1.

The first substrate 100 includes the TFTs and includes, sequentially from the back surface side toward the viewing surface side, a first support substrate 110, gate lines 120G, a gate insulating film, source lines 120S, a first insulating film 130 as the second interlayer insulating film, the common electrode 140, the second insulating film 150, and the plurality of sub-pixel electrodes 160 provided for the respective sub-pixels 1PX and each provided with the slits 160S.

The first substrate 100 includes, on the first support substrate 110, the gate lines 120G parallel to each other and the source lines 120S parallel to each other and intersecting the gate lines 120G via the gate insulating film. The gate lines 120G and the source lines 120S are provided in a grid pattern as a whole so as to define the respective sub-pixels 1PX. At the intersection of each gate line 120G and each source line 120S is disposed a TFT as a switching element.

Each TFT is connected to a corresponding gate line 120G and a corresponding source line 120S among the gate lines 120G and the source lines 120S, and is a three-terminal switch including a gate electrode protruding from the corresponding gate line 120G (being part of the corresponding gate line 120G), a source electrode protruding from the corresponding source line 120S (part of the corresponding source line 120S), a drain electrode connected to a corresponding sub-pixel electrode 160 of the sub-pixel electrodes 160, and a thin-film semiconductor layer. The source electrode and the drain electrode are provided in a source line layer including the source lines 120S. The gate electrode is provided in a gate line layer including the gate lines 120G. Each sub-pixel electrode 160 is connected to the drain electrode via a contact hole provided through the second insulating film 150 and the first insulating film 130.

The thin-film semiconductor layer of each TFT is formed from, for example, a high-resistant semiconductor layer containing a component such as amorphous silicon or polysilicon, and a low-resistant semiconductor layer containing a component such as n+ amorphous silicon, i.e., amorphous silicon doped with an impurity such as phosphorus. The thin-film semiconductor layer may be an oxide semiconductor layer containing, for example, zinc oxide.

The first support substrate 110 is preferably a transparent substrate, such as a glass substrate or a plastic substrate.

The gate insulating film may be, for example, an inorganic insulating film. Examples of the inorganic insulating film include inorganic insulating films containing silicon nitride (SiNx), inorganic insulating films containing silicon oxide (SiO$_2$), and a stack of any of these.

The gate line layer and the source line layer each may be, for example, a single layer of a metal such as copper, titanium, aluminum, molybdenum, or tungsten or an alloy of any of these or a multilayer of any of these single layers. A variety of lines and electrodes defining the gate lines 120G, the source lines 120S, and the TFTs may be produced by, for example, forming a single- or multi-layer film from a metal such as copper, titanium, aluminum, molybdenum, or tungsten or an alloy of any of these by sputtering and then patterning the film by photolithography. Those to be in the same layer among the lines and electrodes may be formed from the same material for efficient production.

The first insulating film 130 and the second insulating film 150 each may be, for example, an inorganic insulating film, an organic insulating film, or a stack of an organic insulating film and an inorganic insulating film. Examples of the inorganic insulating film include an inorganic insulating film containing silicon nitride (SiNx), an inorganic insulating film containing silicon oxide (SiO$_2$), and a stack of any of these. The inorganic insulating film may have a relative permittivity ε of 5 to 7, for example. Examples of the organic insulating film include an organic insulating film containing acrylic resin, an organic insulating film containing polyimide resin, an organic insulating film containing novolac resin, and a stack of any of these. The organic insulating film may have a relative permittivity ε of 2 to 5, for example. The first insulating film 130 is also referred to as a TFT protecting layer or a flattening layer. The first insulating film 130 is preferably a stack of an inorganic insulating film and an organic insulating film. The second insulating film 150 is preferably an inorganic insulating film containing silicon nitride.

The common electrode 140 is a planar electrode. The planar electrode refers to an electrode with no slit or opening within a region overlapping the optical apertures 1PXA of the sub-pixels at least in a plan view. The common electrode 140 is an electrode on substantially the entire surface except for specific portions such as connections (contact holes) between the sub-pixel electrodes 160 and the respective drain electrodes regardless of the boundaries of the sub-pixels. The common electrode 140 receives a common signal controlled to have a constant value so that the common electrode 140 has a constant potential.

The sub-pixel electrodes 160 are each provided in a region defined by two adjacent gate lines 120G and two adjacent source lines 120S. Each sub-pixel electrode 160 is electrically connected to the corresponding source line 120S through the thin-film semiconductor layer of the corresponding TFT. Each sub-pixel electrode 160 is set to have a potential in response to the data signal supplied through the TFT.

Each sub-pixel electrode 160 is provided with the slits 160S parallel to each other. The slits 160S are inclined with respect to the initial alignment azimuth of the liquid crystal molecules. This angle of the slits 160S in the sub-pixel electrode 160 with respect to the initial alignment azimuth of the liquid crystal molecules allows the liquid crystal molecules to rotate in a constant direction, thereby enabling control of the alignment of liquid crystal molecules by voltage control.

Each sub-pixel electrode 160 includes the plurality of linear electrode portions 160L extending in a direction in which the slits 160S extend. The plurality of linear electrode portions 160L include the linear electrode portions 160L1 at the sub-pixel edge area provided at respective end portions and the linear electrode portions 160L2 at the sub-pixel central area provided between the linear electrode portions 160L1 at the sub-pixel edge area.

Examples of the material of the common electrode 140 and the sub-pixel electrodes 160 include indium tin oxide (ITO) and indium zinc oxide (IZO).

Preferably, the following Formula 1 is satisfied:

$$6.4115e^{-0.244P} < Cr < 19.137e^{-0.298P} \quad \text{(Formula 1)}$$

wherein P represents the sub-pixel-to-sub-pixel distance between an end portion 1601X of the plurality of linear electrode portions 160L of the first sub-pixel electrode 1601 close to the second sub-pixel electrode 1602 and an end portion 1602X of the plurality of linear electrode portions 160L of the second sub-pixel electrode 1602 close to the first sub-pixel electrode 1601; and Cr represents the ratio of the capacitance between the first sub-pixel 11PX and the second sub-pixel 12PX to the capacitance in the first sub-pixel 11PX. This mode can give a weaker fringe electric field at the sub-pixel edge area than at the sub-pixel central area to more reduce an increase in the electric field strength at the sub-pixel edge area. The mode can thereby lead to a smaller difference between the electric field strength at the sub-pixel edge area and the electric field strength at the sub-pixel central area, more reducing worsening of flicker after long-term display of a solid white image.

In the case where the second insulating film 150 is formed from the same material in both the region overlapping the linear electrode portions 160L1 at the sub-pixel edge area and the region overlapping the linear electrode portions 160L2 at the sub-pixel central area, the capacitance ratio Cr can be determined by dividing the film thickness of the second insulating film 150 within the region overlapping the linear electrode portions 160L2 at the sub-pixel central area by the film thickness of the second insulating film 150 within the region overlapping the linear electrode portions 160L1 at the sub-pixel edge area. Each film thickness can be determined by film thickness evaluation by SEM on the cross-sectional structure.

In the case where the second insulating film 150 is formed from different materials in the region overlapping the linear electrode portions 160L1 at the sub-pixel edge area and the region overlapping the linear electrode portions 160L2 at the sub-pixel central area, the capacitance ratio Cr can be determined by dividing the relative permittivity of the second insulating film 150 within the region overlapping the linear electrode portions 160L1 at the sub-pixel edge area by the relative permittivity of the second insulating film 150 within the region overlapping the linear electrode portions 160L2 at the sub-pixel central area. The relative permittivity in each region can be evaluated by estimating the material by energy dispersive X-ray spectroscopy (EDX) or other component analysis and actually forming a capacitance test elementary group (TEG) from the estimated material.

The sub-pixel-to-sub-pixel distance P more specifically refers to the distance between the end portion 1601X and the end portion 1602X in the direction in which the first sub-pixel 11PX and the second sub-pixel 12PX are arranged.

The liquid crystal display device 1 more preferably satisfies the following Formula 1-1:

$$Cr = 11.351e^{-0.271P} \quad \text{(Formula 1-1)}$$

This mode can more effectively reduce worsening of flicker after long-term display of a solid white image.

The film thickness H1 of the second insulating film 150 within the region overlapping the linear electrode portions 160L1 at the sub-pixel edge area is greater than the film thickness H2 of the second insulating film 150 within the region overlapping the linear electrode portions 160L2 at the sub-pixel central area for each sub-pixel. This specific mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image.

Figure 3:
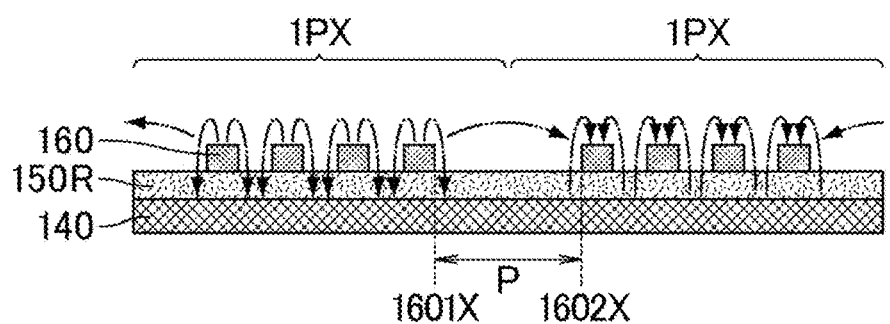
FIG. 3 is a schematic cross-sectional view of an electrode structure of a liquid crystal display device of Comparative Embodiment.

FIG. 3 is a schematic cross-sectional view of an electrode structure of a liquid crystal display device of Comparative Embodiment. In FIG. 3, a fringe electric field is indicated by a dash-dotted arrow and a transverse electric field is indicated by a dashed and double-dotted arrow. The liquid crystal display device of Comparative Embodiment shown in FIG. 3 is a conventional FFS V2 mode liquid crystal display device sequentially including the common electrode 140 in the form of a planar electrode, a second insulating film 150R having a uniform film thickness, and the sub-pixel electrodes 160 provided with slits. As shown in FIG. 3, in the liquid crystal display device of Comparative Embodiment, a fringe electric field is generated at a single polarity within a sub-pixel 1PX and a reverse polarity is generated between sub-pixels 1PX. Thus, not only a fringe electric field but also a transverse electric field is generated between sub-pixels 1PX, so that a stronger electric field is applied between sub-pixels 1PX than within a sub-pixel 1PX. As a result, driving between sub-pixels 1PX occurs at a lower voltage than driving within a sub-pixel 1PX. The transverse electric field varies depending only on the distance between sub-pixels 1PX, while the fringe electric field varies depending on the capacitance between sub-pixels 1PX.

Figure 4:
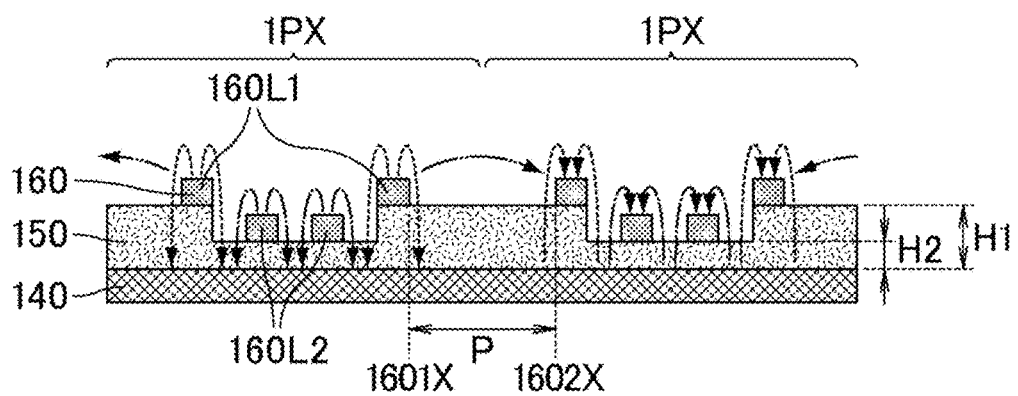
FIG. 4 is a schematic cross-sectional view of an electrode structure of the liquid crystal display device of Embodiment 1.

FIG. 4 is a schematic cross-sectional view of an electrode structure of the liquid crystal display device of Embodiment 1. In FIG. 4, a fringe electric field is indicated by a dash-dotted arrow, a weakened fringe electric field is indicated by a dotted arrow, and a transverse electric field is indicated by a dashed and double-dotted arrow. In the case where the film thickness H1 of the second insulating film 150 within the region overlapping the linear electrode portions 160L1 at the sub-pixel edge area is greater than the film thickness H2 of the second insulating film 150 within the region overlapping the linear electrode portions 160L2 at the sub-pixel central area for each sub-pixel as in the case of the liquid crystal display device 1 of the present embodiment, more specifically in the case where the second insulating film 150 is provided with a step and is thickened within the region overlapping the linear electrode portions 160L1 at the sub-pixel edge area, the sub-pixel-to-sub-pixel distance P is maintained so that the transverse electric field is also maintained. On the other hand, the capacitance is reduced at the sub-pixel edge area so that the fringe electric field is weakened and the electric field strength is also weakened. This results in a higher voltage between sub-pixels 1PX. In the present embodiment, the film thickness H1 of the second insulating film 150 within the region overlapping the linear electrode portions 160L1 at the sub-pixel edge area is made greater than the film thickness H2 for each sub-pixel in accordance with the sub-pixel-to-sub-pixel distance P, i.e., the second insulating film 150 is allowed to have an appropriate height in accordance with the sub-pixel-to-sub-pixel distance P. This makes it possible to match the voltage-transmittance curve (V-T curve) within a sub-pixel 1PX and the V-T curve between sub-pixels 1PX. In this case, the electric field strength within a sub-pixel 1PX is the same as that between sub-pixels 1PX and thus the DC behavior within a sub-pixel 1PX is the same as the DC behavior between sub-pixels 1PX. This enables effective reduction in worsening of flicker after long-term display of a solid white image.

The ratio Cr of the capacitance between the first sub-pixel 11PX and the second sub-pixel 12PX to the capacitance within the first sub-pixel 11PX may be determined by, for example, (film thickness H2)/(film thickness H1).

In the present embodiment, for example, the second insulating film 150 may be provided with a step and thickened within a region overlapping the source lines 120S so that the thick portion may overlap a linear electrode portion 160L1 at the sub-pixel edge area.

The second insulating film 150 includes step portions 150S each between the region having the film thickness H1 and the region having the film thickness H2 for each sub-pixel. In a cross-sectional view, the step portions 150S are vertical to the bottom surface of the second insulating film 150 and the linear electrode portions 160L1 at the sub-pixel edge area each define a single plane with the corresponding step portion 150S. This specific mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image. The expression "in a cross-sectional view, the step portions are vertical to the bottom surface of the second insulating film" means that the step portions each form an angle of 85° or greater and 90° or smaller with the bottom surface of the second insulating film in a cross-sectional view. The expression "the linear electrode portions at the sub-pixel edge area each define a single plane with the corresponding step portion" means that the end portion of each linear electrode portion at the sub-pixel edge area close to the corresponding step portion is on the same plane as the step portion.

JP 2006-58908 A relates to an IPS mode liquid crystal display device, the display mode of which is different from the display mode of the liquid crystal display device 1 of the present embodiment, i.e., the FFS mode. The liquid crystal display device of JP 2006-58908 A includes a comb-shaped common electrode on the data lines with an interlayer insulating film in between. In contrast, the liquid crystal display device 1 of the present embodiment includes the first insulating film 130, the planar common electrode 140, and the second insulating film 150 on the source lines 120S. This structure is different from that of the liquid crystal display device of JP 2006-58908 A. In JP 2006-58908 A, no examination is made on reduction in worsening of flicker after long-term display of a solid white image.

JP 2009-192932 A and WO 2015/087585 relate to an FFS V3 mode liquid crystal display device, the display mode of which is different from the display mode of the liquid crystal display device 1 of the present embodiment, i.e., the FFS V2 mode. The liquid crystal display devices of JP 2009-192932 A and WO 2015/087585 each include a common electrode (counter electrode) that covers the steps. In contrast, the liquid crystal display device of the present embodiment includes the planar common electrode 140 on the source lines 120S. Still, the common electrode 140 is not configured to cover the steps. This structure is different from those of the liquid crystal display devices of JP 2009-192932 A and WO 2015/087585. In JP 2009-192932 A and WO 2015/087585, no examination is made on reduction in worsening of flicker after long-term display of a solid white image.

The film thickness H1 is greater than the film thickness H2. The difference between the film thickness H1 and the film thickness H2 is preferably 5 nm or greater. This mode can give a weaker fringe electric field only at the sub-pixel edge area to more reduce an increase in the electric field strength at the sub-pixel edge area. The mode can thereby more reduce worsening of flicker after long-term display of a solid white image.

The difference between the film thickness H1 and the film thickness H2 is preferably 600 nm or smaller. A large step in the second insulating film 150 may cause a worsened contrast ratio of the liquid crystal display device. Still, the film thickness H1 and the film thickness H2 with a difference of 600 nm or smaller can reduce the worsening of contrast ratio of the liquid crystal display device 1.

For example, the film thickness H1 is 185 nm or greater and 780 nm or smaller, more preferably 200 nm or greater and 700 nm or smaller, still more preferably 230 nm or greater and 670 nm or smaller.

For example, the film thickness H2 is preferably 100 nm or greater and 500 nm or smaller, more preferably 150 nm or greater and 400 nm or smaller, still more preferably 180 nm or greater and 300 nm or smaller.

The first alignment film 410 and the second alignment film 420 have a function of controlling the alignment of liquid crystal molecules in the liquid crystal layer 300. When the voltage applied to the liquid crystal layer 300 is lower than the threshold voltage (including the case of applying no voltage), mainly the function of the first alignment film 410 and the second alignment film 420 controls the major axes of the liquid crystal molecules in the liquid crystal layer 300 to be parallel to the first alignment film 410 and the second alignment film 420.

The expression "the major axes of the liquid crystal molecules in the liquid crystal layer 300 to be parallel to the first alignment film 410 and the second alignment film 420" herein means that the tilt angle (including pre-tilt angle) of the liquid crystal molecules is 0° to 5°, preferably 0° to 3°, more preferably 0° to 1°, with respect to the first alignment film 410 and the second alignment film 420. The tilt angle of the liquid crystal molecules means the angle of the major axes (optical axes) of the liquid crystal molecules inclined with respect to the surfaces of the first alignment film 410 and the second alignment film 420.

The first alignment film 410 and the second alignment film 420 are each a layer having undergone alignment treatment for controlling the alignment of liquid crystal molecules, and may be an alignment film that is common in the field of liquid crystal display devices, such as a polyimide film. Examples of the material of the first alignment film 410 and the second alignment film 420 include polymers having a main chain of polyimide, polyamic acid, or polysiloxane. A photoalignment film material having a photo-reactive site (functional group) in the main chain or at a side chain is preferred.

The liquid crystal layer 300 contains liquid crystal molecules to be aligned parallel to the first substrate 100 when no voltage is applied. Voltage applied between a pair of electrodes, i.e., the common electrode 140 and the sub-pixel electrodes 160 generates an electric field in the liquid crystal layer 300, which changes the alignment of the liquid crystal molecules to control the amount of light transmitted. The liquid crystal molecules in the liquid crystal layer 300 are horizontally aligned by the control forces of the first alignment film 410 and the second alignment film 420 when no voltage is applied (with no voltage applied) between the paired electrodes of the first substrate 100, while rotating in the in-plane direction in accordance with the transverse electric field generated in the liquid crystal layer 300 when voltage is applied (with voltage applied) between the paired substrates.

The liquid crystal molecules may have a positive value or a negative value for the anisotropy of dielectric constant ($\Delta\varepsilon$) defined by the following formula L. The liquid crystal layer 300 in the present embodiment contains liquid crystal molecules having a negative $\Delta\varepsilon$ value. Liquid crystal molecules having a positive anisotropy of dielectric constant are also referred to as a positive liquid crystal, and liquid crystal molecules having a negative anisotropy of dielectric constant are also referred to as a negative liquid crystal. The major axis direction of liquid crystal molecules corresponds to the slow axis direction.

$$\Delta\varepsilon = \text{(dielectric constant in major axis direction)} - \text{(dielectric constant in minor axis direction)} \quad \text{(Formula L)}$$

In the case of the liquid crystal layer 300 containing a negative liquid crystal, the slow axis of the liquid crystal layer 300 preferably forms an angle of substantially 0° with the absorption axis of the first linear polarizer. In the case of the liquid crystal layer 300 containing a positive liquid crystal, the slow axis of the liquid crystal layer 300 preferably forms an angle of substantially 90° with the absorption axis of the first linear polarizer.

The second substrate 200 includes, sequentially from the viewing surface side toward the back surface side, a second support substrate 210, a black matrix layer 220, a color filter (CF) layer 230, and an overcoat layer 240.

The second support substrate 210 is preferably a transparent substrate, such as a glass substrate or a plastic substrate.

The black matrix layer 220 is provided on the second support substrate 210 in a grid pattern corresponding to the gate lines 120G and the source lines 120S and is placed outside the optical apertures 1PXA.

The CF layer 230 has a structure in which red color filters 230R, green color filters 230G, and blue color filters 230B are arranged in the plane and defined by the black matrix layer 220. The red color filters 230R, the green color filters 230G, and the blue color filters 230B each may be formed from a transparent resin containing a pigment, for example. Typically, each pixel includes a combination of a red color filter 230R, a green color filter 230G, and a blue color filter 230B, and a desired color is provided for each pixel by mixing light beams of the respective colors having passed through the red color filter 230R, the green color filter 230G, and the blue color filter 230B while controlling the amounts thereof. The red color filters 230R, the green color filters 230G, and the blue color filters 230B may have different thicknesses. In other words, the surface of the CF layer 230 close to the liquid crystal layer 300 may not be flat. The pixel is a minimum unit to define a display image and is a region composed of sub-pixels of different colors.

The overcoat layer 240 covers the surface of the CF layer 230 close to the liquid crystal layer 300. The overcoat layer 240 has a function of flattening a base of the second alignment film 420 when the surface of the CF layer 230 close to the liquid crystal layer 300 is not flat. The overcoat layer 240 can prevent dissolution of impurities in the CF layer 230 toward the liquid crystal layer 300. The material of the overcoat layer 240 preferably used is a photo-curable or thermosetting transparent resin. A photo-curable transparent resin may be used together with a photopolymerization initiator, an additive, a solvent, and the like. The overcoat layer 240 may be an organic film (relative permittivity $\varepsilon=3$ to 4), for example. The overcoat layer 240 may have a thickness of 0.5 to 2.0 µm, preferably 0.8 to 1.2 µm.

The first linear polarizer and the second linear polarizer each may be, for example, a polarizer (absorptive polarizer) obtained by dying a polyvinyl alcohol (PVA) film with an anisotropic material such as an iodine complex (or dye) to adsorb the anisotropic material on the PVA film and then stretching the film for alignment. In order to ensure the mechanical strength and the heat and moisture resistance, the PVA film is commonly laminated with a protecting film such as a triacetyl cellulose (TAC) film on each surface for practical use.

The absorption axis of the first linear polarizer and the absorption axis of the second linear polarizer are preferably perpendicular to each other. This mode allows the first linear polarizer and the second linear polarizer to be arranged in crossed Nicols, ensuring a good black display state when no voltage is applied. The description herein is made with the azimuth of the absorption axis of the first linear polarizer being defined as 0°. In this definition, the azimuth of the absorption axis of the second linear polarizer is preferably 90°.

The expression "two axes (directions) are perpendicular to each other" herein means that the angle (absolute value) formed by the two axes is within the range of 90°±3°, preferably within the range of 90°±1°, more preferably within the range of 90°±0.5°, particularly preferably at 90° (perfectly perpendicular to each other). Also, the expression "two axes (directions) are parallel to each other" herein means that the angle (absolute value) formed by the two axes is within the range of 0°±3°, preferably within the range of 0°±1°, more preferably within the range of 0°±0.5°, particularly preferably at 0° (perfectly parallel to each other).

The backlight 20 may be any backlight that applies light to the liquid crystal panel 10, such as a direct-lit backlight or an edge-lit backlight. The backlight 20 may include a light source and a light guide plate, for example. The light guide plate may be a product typically used in the field of liquid crystal display devices. The backlight 20 may further include an optical sheet such as a diffuser or a prism sheet as appropriate.

The light source may be any product that emits light including visible light and may be one that emits light including visible light alone or one that emits light including both visible light and ultraviolet light. In order to provide color display using the liquid crystal display device 1, a light source that emits white light is preferred. Preferred examples of the light source include cold cathode fluorescent lamps (CCFLs) and light-emitting diodes (LEDs). The term "visible light" herein means light (electromagnetic wave) having a wavelength of 380 nm or longer and shorter than 800 nm.

The liquid crystal display device 1 of the present embodiment includes, in addition to the liquid crystal panel 10 and the backlight 20, components including: external circuits such as a tape carrier package (TCP) and a printed-circuit board (PCB); optical films such as a viewing angle widening film and a luminance improving film; and a bezel (frame). One component may be incorporated in another component depending on the types of the components. Components other than the aforementioned components are not limited, and those commonly used in the field of liquid crystal display devices may be used. Thus, the description thereof is omitted.

Next, a method for producing the liquid crystal display device 1 of the present embodiment is described. The first substrate 100 may be produced in accordance with a method for producing a TFT substrate of a common FFS mode liquid crystal display device including a transparent electrode.

First, in accordance with a common method, the following steps are successively performed: forming gate lines 120G and gate electrodes on a first support substrate 110 (step of forming a gate line layer); forming a gate insulating film (step of forming a gate insulating film); forming a thin-film semiconductor (step of forming a semiconductor layer); and forming source lines 120S, a source electrode, and a drain electrode (step of forming a source line layer).

Next, a first insulating film 130 is formed on the source line layer. The following describes the case where the first insulating film 130 is a stack of an inorganic insulating film and an organic insulating film as an example. First, an inorganic film such as a silicon oxide film or a silicon nitride film is formed on the source line layer by chemical vapor deposition (CVD) or sputtering, whereby an inorganic insulating film is formed. A positive photo resist is applied as an organic insulating film material onto the inorganic insulating film by, for example, spin coating and then exposed to light through a photomask and developed, whereby the photo resist is patterned and an organic insulating film is formed. As a result, a stack of the inorganic insulating film and the organic insulating film is obtained as the first insulating film 130. The organic insulating film may not be provided within the region overlapping the common electrode 140 and the sub-pixel electrodes 160 and within the region overlapping the optical apertures.

Next, the material of a common electrode 140 is used to form a transparent conductive film by, for example, sputtering on the first insulating film 130 and the film is then patterned into a desired shape, whereby the common electrode 140 is formed.

Next, a second insulating film 150 is formed on the common electrode 140. In the case where the second insulating film 150 is an inorganic insulating film, for example, an inorganic insulating film such as a silicon nitride film or a silicon oxide film is formed on the common electrode 140 by, for example, CVD and the inorganic insulating film is patterned into a desired shape, whereby the second insulating film 150 is formed.

Next, the material of sub-pixel electrodes 160 is used to form a transparent conductive film by, for example, sputtering on the second insulating film 150 and the film is then patterned, whereby the sub-pixel electrodes 160 provided with slits 160S are formed. As a result, the first substrate 100 is produced.

Further, patterning of the sub-pixel electrodes 160 is followed by application of an alignment film material onto the first substrate 100, whereby a first alignment film 410 is formed. The alignment film material may be applied by, for example, an ink-jet method or a roll coater method.

The second substrate 200 may be produced in accordance with a method for producing a counter substrate of a common FFS mode liquid crystal display device.

First, a black matrix layer 220 is formed on the second support substrate 210 and patterned into a desired matrix pattern by, for example, photolithography.

Next, red color filters 230R, green color filters 230G, and blue color filters 230B are sequentially formed from resist materials by spin coating or slit coating and patterned by, for example, photolithography, whereby a CF layer 230 is formed. In the present embodiment, the case where the second substrate 200 includes the CF layer 230 is described. Still, the CF layer 230 may be provided not on the second substrate 200 but on the first substrate 100. In this case, a color filter layer may be formed instead of the organic insulating film in production of the first insulating film 130 of the first substrate 100.

Next, the overcoat layer 240 formed from a transparent organic insulating film is formed on the black matrix layer 220 and the CF layer 230 by, for example, spin coating or slit coating. Further, a transparent organic insulating film material is applied to the overcoat layer 240 by, for example, spin coating or slit coating and a photo spacer is patterned at a desired position. As a result, the second substrate 200 is produced.

Further, an alignment film material is applied to the second substrate 200, whereby a second alignment film 420 is formed.

A sealing material is applied to the first substrate 100 or the second substrate 200 as obtained above and the liquid crystal layer 300 is formed in a region defined by the sealing material. The first substrate 100 and the second substrate 200 are then attached to each other with the sealing material, whereby the liquid crystal display device 1 of the present embodiment is produced. Alternatively, the liquid crystal layer 300 in the region defined by the sealing material may be formed after the first substrate 100 and the second substrate 200 are attached to each other. A specific example is a vacuum injection method of injecting liquid crystal in a vacuum chamber through an inlet in the pattern drawn with the sealing material.

Embodiment 2

Figure 5:
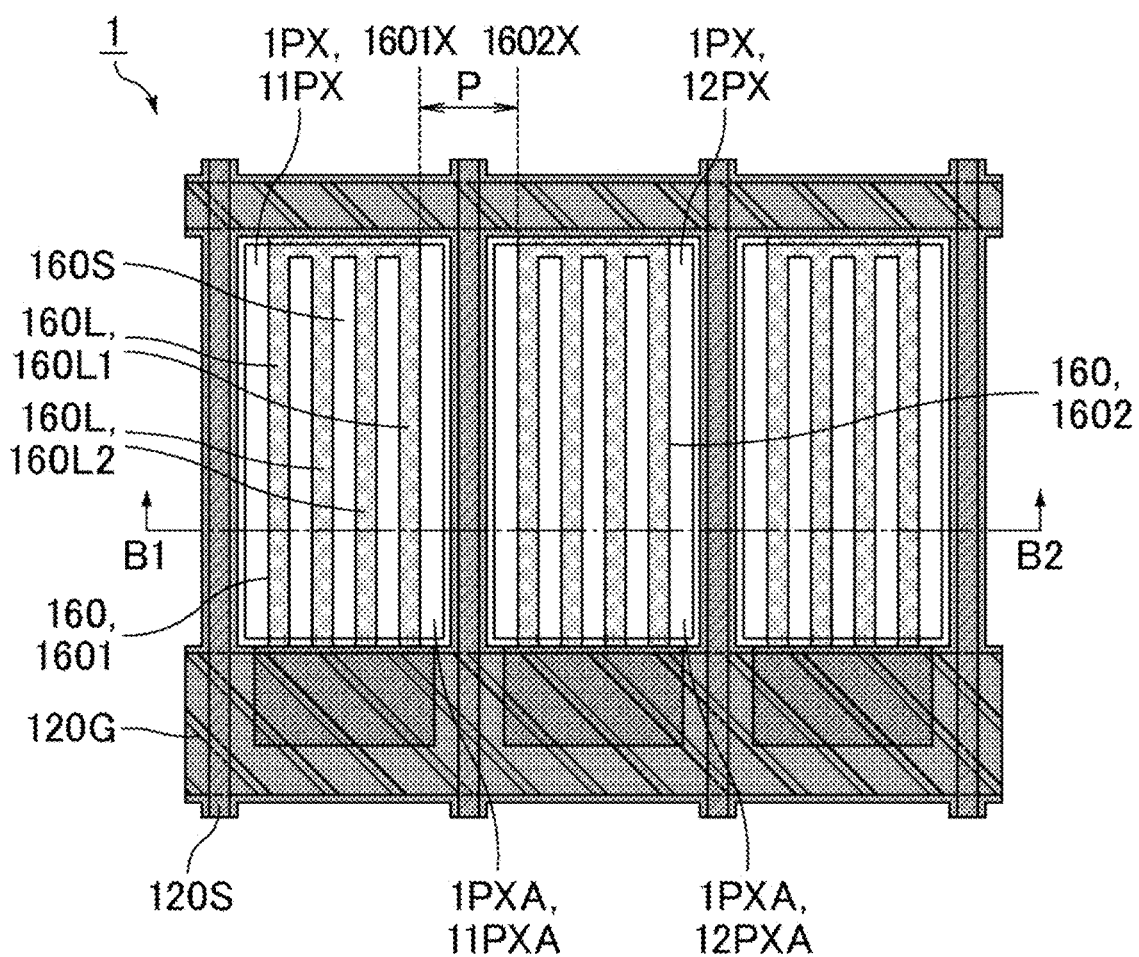
FIG. 5 is a schematic plan view of a liquid crystal display device of Embodiment 2.
Figure 6:
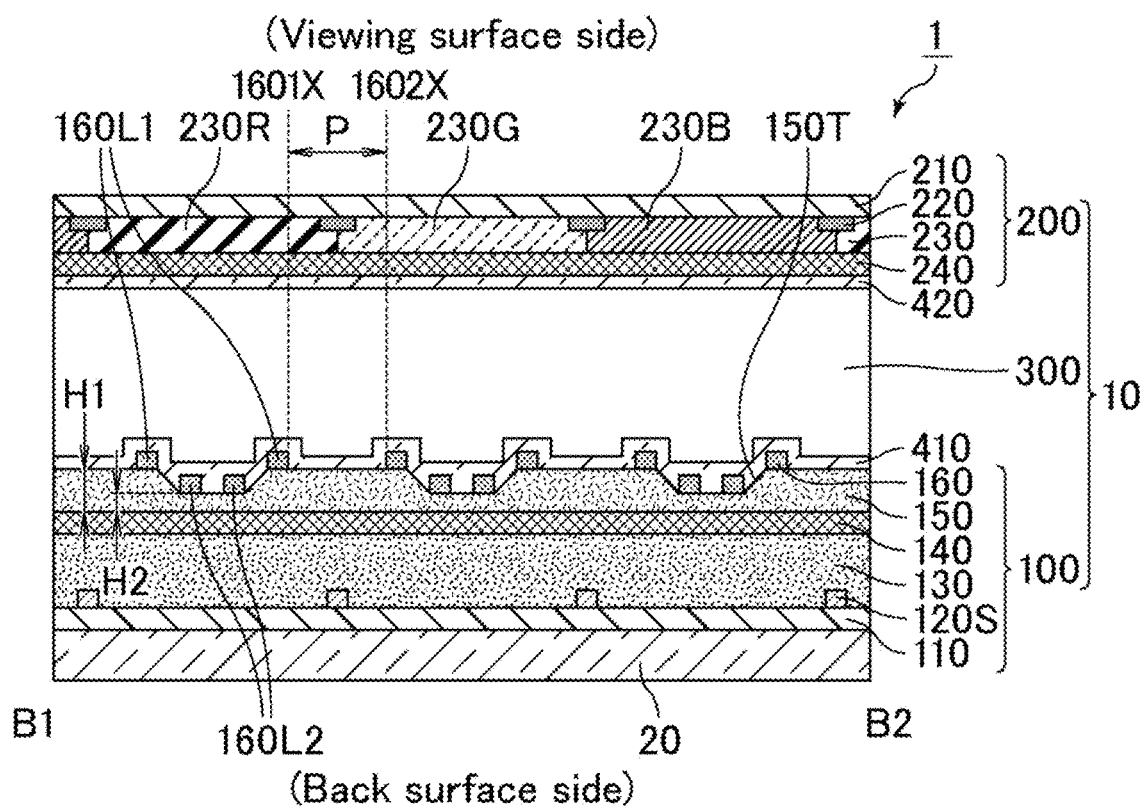
FIG. 6 is a schematic cross-sectional view of the liquid crystal display device of Embodiment 2 taken along the B1-B2 line in FIG. 5.

In the present embodiment, features unique to the present embodiment are mainly described, and descriptions for the points similar to Embodiment 1 are omitted. The present embodiment is substantially the same as Embodiment 1 except that the second insulating film 150 has a different shape. FIG. 5 is a schematic plan view of a liquid crystal display device of Embodiment 2. FIG. 6 is a schematic cross-sectional view of the liquid crystal display device of Embodiment 2 taken along the B1-B2 line in FIG. 5.

In the liquid crystal display device 1 of Embodiment 1, the second insulating film 150 includes step portions 150S each between the region having the film thickness H1 and the region having the film thickness H2 for each sub-pixel. In a cross-sectional view, the step portions 150S are vertical to the bottom surface of the second insulating film 150 and the linear electrode portions 160L1 at the sub-pixel edge area each define a single plane with the corresponding step portion 150S. Thus, when the second insulating film 150 provided with the step portions 150S is formed and then the sub-pixel electrodes 160 are formed in production of the liquid crystal display device 1 of Embodiment 1, any of the sub-pixel electrodes 160 may be formed such that it crosses a step portion 150S to cut the step.

In the liquid crystal display device 1 of the present embodiment, as shown in FIG. 5 and FIG. 6, the second insulating film 150 includes step portions 150T each between the region having the film thickness H1 and the region having the film thickness H2 for each sub-pixel. In a cross-sectional view, the step portions 150T are diagonal to the bottom surface of the second insulating film 150 and the linear electrode portions 160L1 at the sub-pixel edge area each do not define a single plane with the corresponding step portion 150T. This specific mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image. This mode can also reduce formation of any of the sub-pixel electrodes 160 such that it crosses a step portion 150T to cut the step in production of the liquid crystal display device 1. The expression "in a cross-sectional view, the step portions are diagonal to the bottom surface of the second insulating film" means that the step portions each form an angle of greater than 0° and smaller than 85° with the bottom surface of the second insulating film in a cross-sectional view.

Embodiment 3

Figure 7:
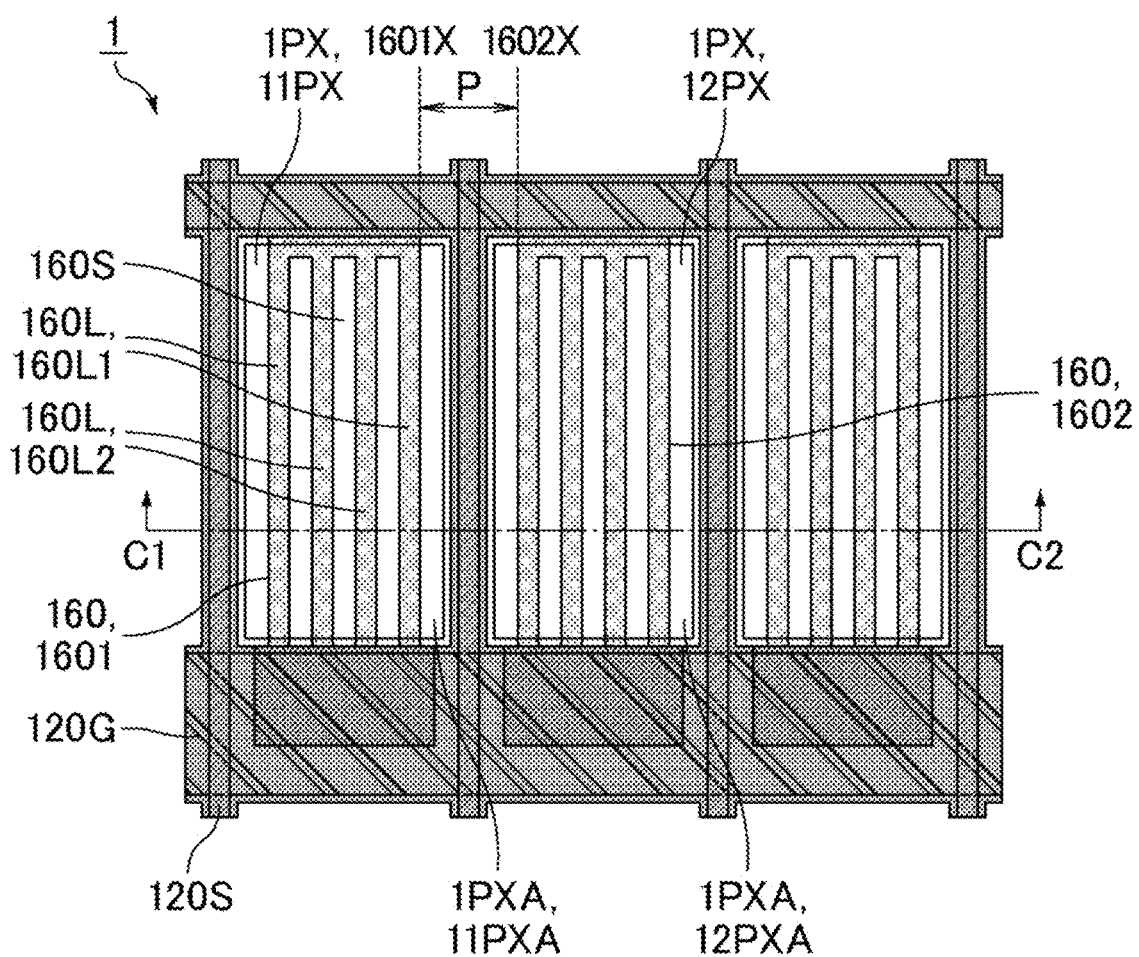
FIG. 7 is a schematic plan view of a liquid crystal display device of Embodiment 3.
Figure 8:
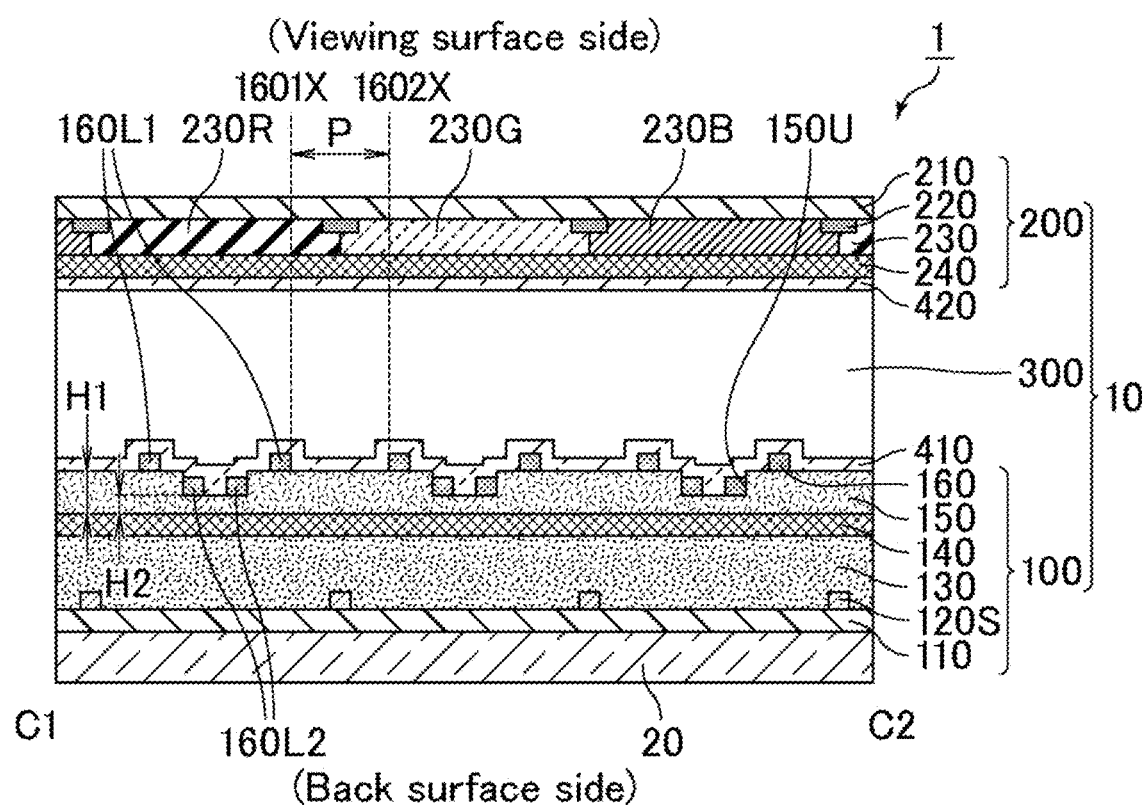
FIG. 8 is a schematic cross-sectional view of the liquid crystal display device of Embodiment 3 taken along the C1-C2 line in FIG. 7.

In the present embodiment, features unique to the present embodiment are mainly described, and descriptions for the points similar to Embodiment 1 are omitted. The present embodiment is substantially the same as Embodiment 1 except for the shape of the second insulating film 150. FIG. 7 is a schematic plan view of a liquid crystal display device of Embodiment 3. FIG. 8 is a schematic cross-sectional view of the liquid crystal display device of Embodiment 3 taken along the C1-C2 line in FIG. 7.

As described above, when the second insulating film 150 provided with the step portions 150S is formed and then the sub-pixel electrodes 160 are formed in production of the liquid crystal display device 1 of Embodiment 1, any of the sub-pixel electrodes 160 may be formed such that it crosses a step portion 150S to cut the step.

In the liquid crystal display device 1 of the present embodiment, as shown in FIG. 7 and FIG. 8, the second insulating film 150 includes step portions 150U each between the region having the film thickness H1 and the region having the film thickness H2 for each sub-pixel. In a cross-sectional view, the step portions 150U are vertical to the bottom surface of the second insulating film 150 and the linear electrode portions 160L1 at the sub-pixel edge area each do not define a single plane with the corresponding step portion 150U. This specific mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image. This mode can also reduce formation of any of the sub-pixel electrodes 160 such that it crosses a step portion 150U to cut the step in production of the liquid crystal display device.

Embodiment 4

Figure 9:
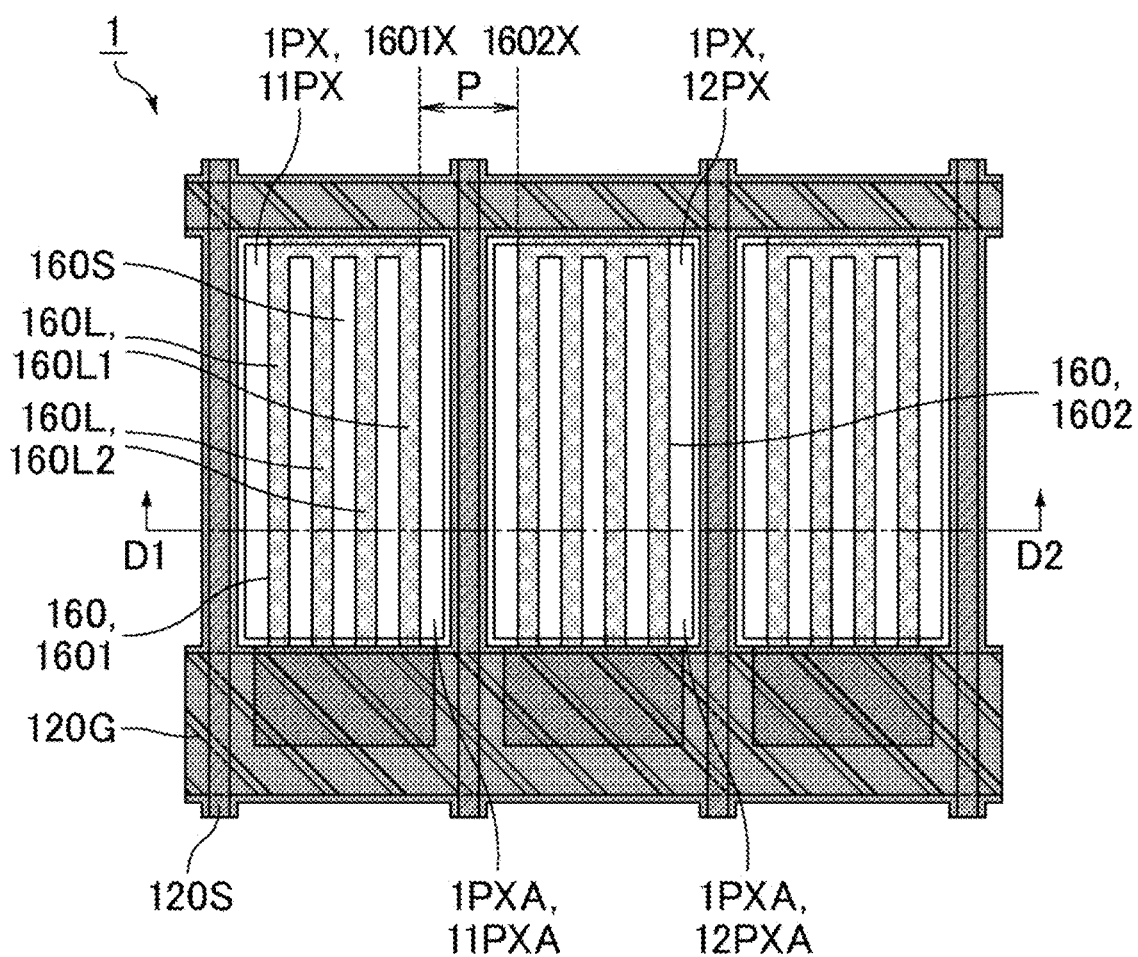
FIG. 9 is a schematic plan view of a liquid crystal display device of Embodiment 4.
Figure 10:
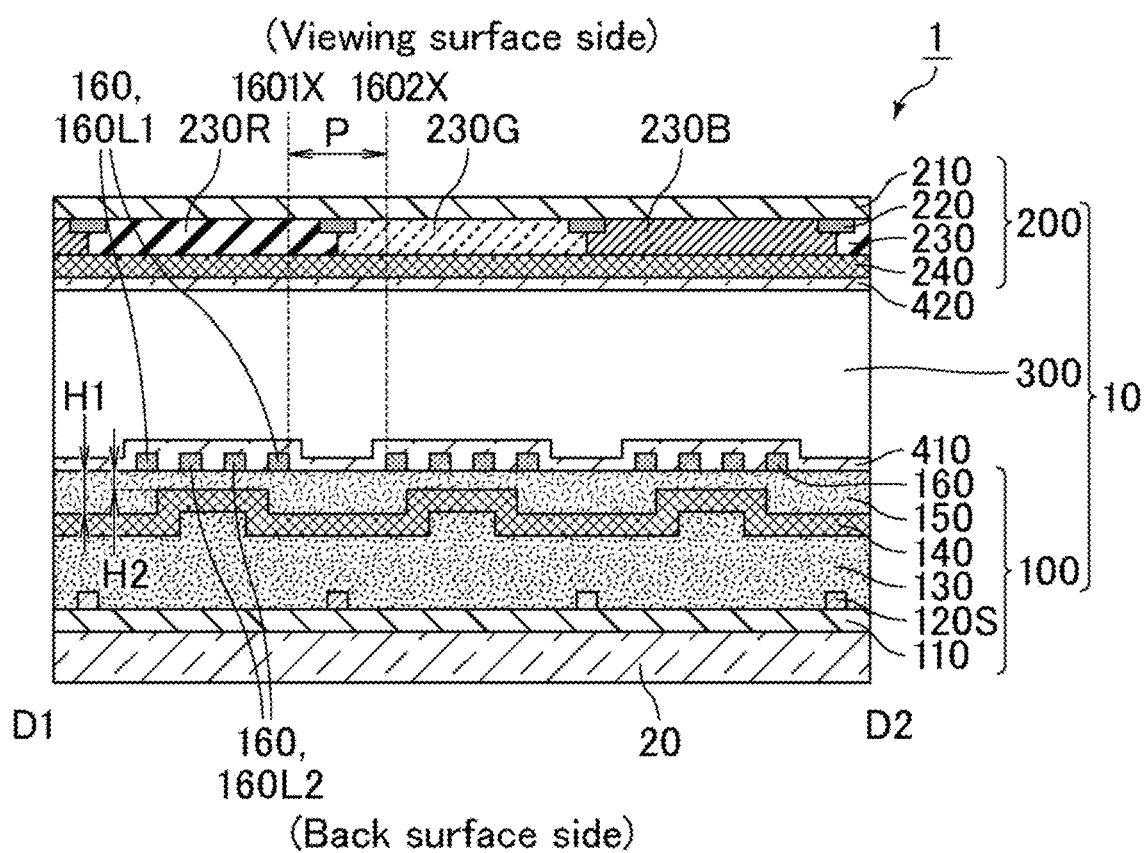
FIG. 10 is a schematic cross-sectional view of a first substrate in the liquid crystal display device of Embodiment 4 taken along the D1-D2 line in FIG. 9.

In the present embodiment, features unique to the present embodiment are mainly described, and descriptions for the points similar to Embodiment 1 are omitted. The present embodiment is substantially the same as Embodiment 1 except for the shapes of the first insulating film 130, the common electrode 140, and the second insulating film 150. FIG. 9 is a schematic plan view of a liquid crystal display device of Embodiment 4. FIG. 10 is a schematic cross-sectional view of a first substrate of the liquid crystal display device of Embodiment 4 taken along the D1-D2 line in FIG.

9. The liquid crystal display device of the present embodiment has the same structure as in Embodiment 1 except for the first substrate 100. Thus, FIG. 10 shows the structure of the first substrate 100 alone.

In Embodiments 1 to 3, the second insulating film 150 may be provided with a step and thickened within a region overlapping the source lines 120S so that the thick portion overlaps a linear electrode portion 160L1 at the sub-pixel edge area. Accordingly, in Embodiments 1 to 3, the steps of the second insulating film 150 may cause poor flatness of the surface of the first substrate 100, possibly resulting in a high black luminance and low contrast ratio of the liquid crystal display device.

In contrast, as shown in FIG. 9 and FIG. 10, the liquid crystal display device 1 of the present embodiment further includes the first insulating film 130 as the second interlayer insulating film on the common electrode 140 opposite to the second insulating film 150, wherein the film thickness of the first insulating film 130 within the region overlapping the linear electrode portions 160L1 at the sub-pixel edge area is smaller than the film thickness of the first insulating film 130 within the region overlapping the linear electrode portions 160L2 at the sub-pixel central area for each sub-pixel, and the linear electrode portions 160L1 at the sub-pixel edge area and the linear electrode portions 160L2 at the sub-pixel central area are provided on the same plane. This specific mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image. This mode can also achieve the flatness of the surface of the first substrate 100 close to the liquid crystal layer 300 at a level comparable to that in Comparative Embodiment while satisfying the condition such that the film thickness H1 of the second insulating film 150 is greater than the film thickness H2 thereof for each sub-pixel. As a result, worsening of the contrast ratio can be reduced or prevented.

Specifically, in the present embodiment, the first insulating film 130 is shaved and thinned within a region overlapping the source lines 120S so that the first insulating film 130 has a step portion. On the first insulating film 130 provided with the step portion are provided the common electrode 140, the second insulating film 150, and the sub-pixel electrodes 160, whereby the surface of the first substrate 100 close to the liquid crystal layer 300 is flattened.

Embodiment 5

Figure 11:
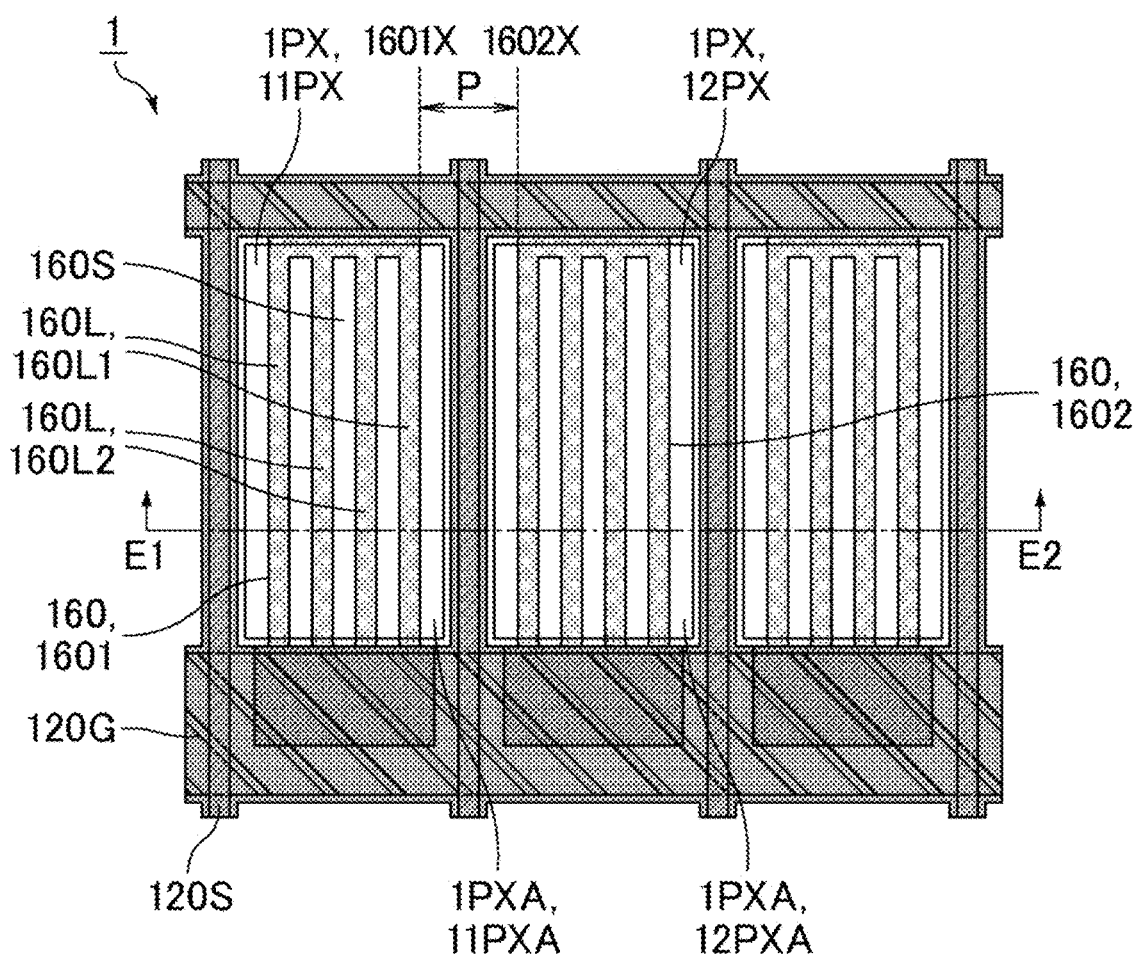
FIG. 11 is a schematic plan view of a liquid crystal display device of Embodiment 5.
Figure 12:
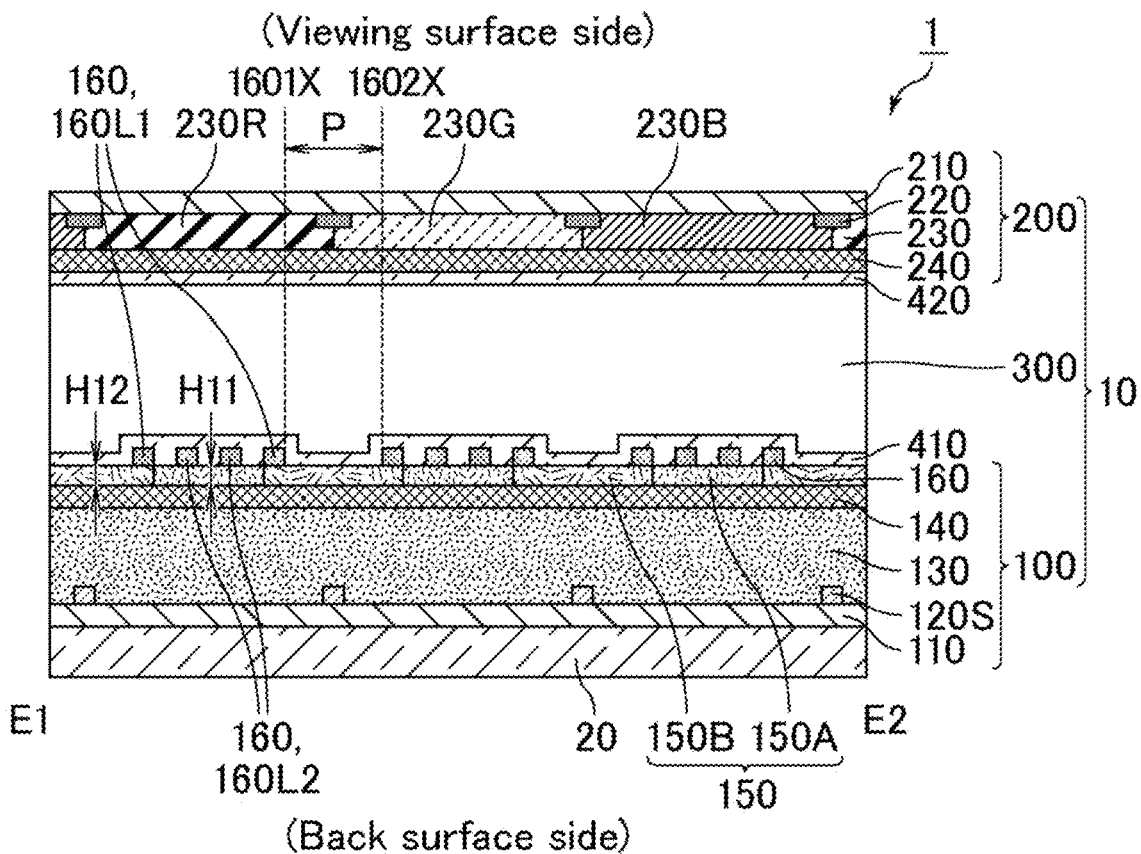
FIG. 12 is a schematic cross-sectional view of a first substrate in the liquid crystal display device of Embodiment 5 taken along the E1-E2 line in FIG. 11.
Figure 13:
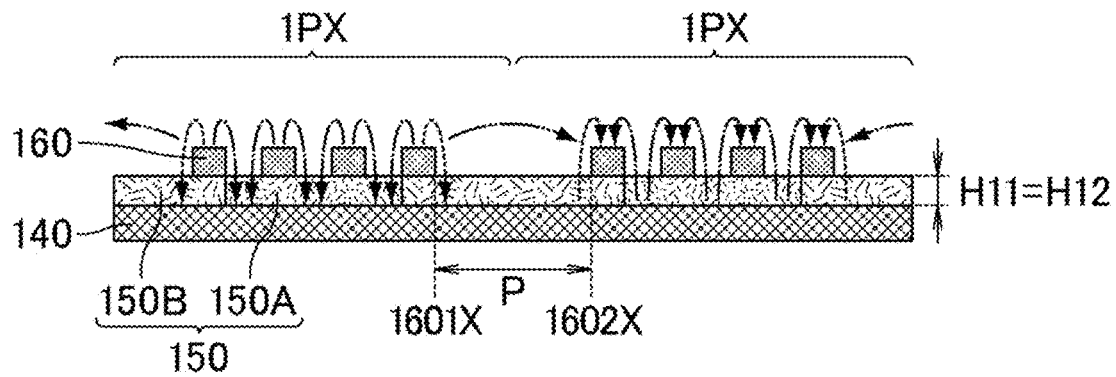
FIG. 13 is a schematic cross-sectional view of an electrode structure of the liquid crystal display device of Embodiment 5.

In the present embodiment, features unique to the present embodiment are mainly described, and descriptions for the points similar to Embodiment 1 are omitted. The present embodiment is substantially the same as Embodiment 1 except that the second insulating film 150 includes two types of insulating films having different relative permittivities. FIG. 11 is a schematic plan view of a liquid crystal display device of Embodiment 5. FIG. 12 is a schematic cross-sectional view of a first substrate of the liquid crystal display device of Embodiment 5 taken along the E1-E2 line in FIG. 11. The liquid crystal display device of the present embodiment has the same structure as in Embodiment 1 except for the first substrate 100. Thus, FIG. 12 shows the structure of the first substrate 100 alone. FIG. 13 is a schematic cross-sectional view of an electrode structure of the liquid crystal display device of Embodiment 5. In FIG. 13, a fringe electric field is indicated by a dash-dotted arrow, a weakened fringe electric field is indicated by a dotted arrow, and a transverse electric field is indicated by a dashed and double-dotted arrow.

In Embodiments 1 to 4, the second insulating film 150 within the region overlapping the linear electrode portions 160L1 at the sub-pixel edge area and the second insulating film 150 within the region overlapping the linear electrode portions 160L2 at the sub-pixel central area are formed from the same material, and the film thickness H1 of the second insulating film 150 within the region overlapping the linear electrode portions 160L1 at the sub-pixel edge area is greater than the film thickness H2 of the second insulating film 150 within the region overlapping the linear electrode portions 160L2 at the sub-pixel central area for each sub-pixel.

In the present embodiment, as shown in FIG. 11 to FIG. 13, the second insulating film 150 includes a first dielectric insulating film 150A within the region overlapping the linear electrode portions 160L2 at the sub-pixel central area and a second dielectric insulating film 150B that is provided within the region overlapping the linear electrode portions 160L1 at the sub-pixel edge area and that has a lower relative permittivity than the first dielectric insulating film 150A for each sub-pixel. The film thickness H11 of the first dielectric insulating film 150A and the film thickness H12 of the second dielectric insulating film 150B are equal to each other. This specific mode can give a weaker fringe electric field at the sub-pixel edge area than at the sub-pixel central area to reduce an increase in the electric field strength at the sub-pixel edge area. The mode can thereby lead to a small difference between the electric field strength at the sub-pixel edge area and the electric field strength at the sub-pixel central area, reducing worsening of flicker after long-term display of a solid white image. This mode can also achieve the flatness of the surface of the first substrate 100 close to the liquid crystal layer 300 at a level comparable to that in Comparative Embodiment. As a result, worsening of the contrast ratio can be reduced or prevented.

Specifically, in the present embodiment, the relative permittivity of the second insulating film 150 within the region overlapping the source lines 120S is smaller than that at the sub-pixel central area for each sub-pixel.

As shown in FIG. 3 above, in the FFS V2 mode liquid crystal display device of Comparative Embodiment, a fringe electric field is generated at a single polarity within a sub-pixel 1PX and a reverse polarity is generated between sub-pixels 1PX. Thus, not only a fringe electric field but also a transverse electric field is generated between sub-pixels 1PX, so that a stronger electric field is applied between sub-pixels 1PX than within a sub-pixel 1PX. As a result, driving between sub-pixels 1PX occurs at a lower voltage than driving within a sub-pixel 1PX. The transverse electric field varies depending only on the distance between sub-pixels 1PX, while the fringe electric field varies depending on the capacitance between sub-pixels 1PX.

In the liquid crystal display device 1 of the present embodiment, the relative permittivity of the second dielectric insulating film 150B is lower than the relative permittivity of the first dielectric insulating film 150A. In this mode, the sub-pixel-to-sub-pixel distance P is maintained so that the transverse electric field is also maintained. On the other hand, the relative permittivity of the second dielectric insulating film 150B is lower than that of the first dielectric insulating film 150A so that the capacitance is reduced, the fringe electric field is weakened, and the electric field strength is weakened at the sub-pixel edge area. This results in a higher voltage between sub-pixels 1PX. In the present embodiment, the relative permittivity of the second dielectric insulating film 150B is optimized in accordance with the sub-pixel-to-sub-pixel distance P. This makes it possible to match the V-T curve within a sub-pixel 1PX and the V-T curve between sub-pixels 1PX. In this case, the electric field strength within a sub-pixel 1PX is the same as that between sub-pixels 1PX and thus the DC behavior within a sub-pixel 1PX is the same as that between sub-pixels 1PX. This enables reduction in worsening of flicker after long-term display of a solid white image.

The ratio Cr of the capacitance between the first sub-pixel 11PX and the second sub-pixel 12PX to the capacitance within the first sub-pixel 11PX may be determined by, for example, (relative permittivity of second dielectric insulating film)/(relative permittivity of first dielectric insulating film).

The liquid crystal display device 1 including the second insulating film 150 that includes the first dielectric insulating film 150A and the second dielectric insulating film 150B having a relative permittivity smaller than the first dielectric insulating film 150A may be, for example, achieved by making the nitrogen content of SiNx in the second dielectric insulating film 150B higher than that in the first dielectric insulating film 150A (making the Si/N ratio of SiNx lower than that in the first dielectric insulating film 150A). This liquid crystal display device 1 may also be achieved by forming the first dielectric insulating film 150A from an inorganic insulating film containing SiNx while forming the second dielectric insulating film 150B from an inorganic insulating film containing SiNO or an inorganic insulating film containing SiOx. This liquid crystal display device 1 may also be achieved by adding an organic substance to the second dielectric insulating film 150B.

The difference between the relative permittivity of the first dielectric insulating film 150A and the relative permittivity of the second dielectric insulating film 150B is preferably 0.2 or higher and 1.5 or lower. This mode can more reduce worsening of flicker after long-term display of a solid white image. The difference between the relative permittivity of the first dielectric insulating film 150A and the relative permittivity of the second dielectric insulating film 150B is more preferably 0.4 or higher and 1.3 or lower, still more preferably 0.6 or higher and 1.0 or lower.

In the case where the sub-pixel-to-sub-pixel distance P is 9.5 μm or greater and smaller than 10.5 μm and the relative permittivity of the first dielectric insulating film 150A is 6.5 or higher and 7.5 or lower, the relative permittivity of the second dielectric insulating film 150B is preferably 4 or higher and 7 or lower.

In the case where the sub-pixel-to-sub-pixel distance P is 10.5 μm or greater and smaller than 11.5 μm and the relative permittivity of the first dielectric insulating film 150A is 6.5 or higher and 7.5 or lower, the relative permittivity of the second dielectric insulating film 150B is preferably 3 or higher and 5 or lower.

In the case where the sub-pixel-to-sub-pixel distance P is 11.5 μm or greater and smaller than 12.5 μm and the relative permittivity of the first dielectric insulating film 150A is 6.5 or higher and 7.5 or lower, the relative permittivity of the second dielectric insulating film 150B is preferably 2.2 or higher and 3.6 or lower.

In the case where the sub-pixel-to-sub-pixel distance P is 12.5 μm or greater and smaller than 13.5 μm and the relative permittivity of the first dielectric insulating film 150A is 6.5 or higher and 7.5 or lower, the relative permittivity of the second dielectric insulating film 150B is preferably 1.8 or higher and 2.6 or lower.

In the case where the sub-pixel-to-sub-pixel distance P is 13.5 μm or greater and smaller than 14.5 μm and the relative permittivity of the first dielectric insulating film 150A is 6.5 or higher and 7.5 or lower, the relative permittivity of the second dielectric insulating film 150B is preferably 1.7 or higher and 2.2 or lower.

Hereinafter, the present invention is described based on examples and comparative examples. The examples, however, are not intended to limit the present invention.

Liquid Crystal Display Devices of Example 1-1 and Comparative Example 1

Figure 14:
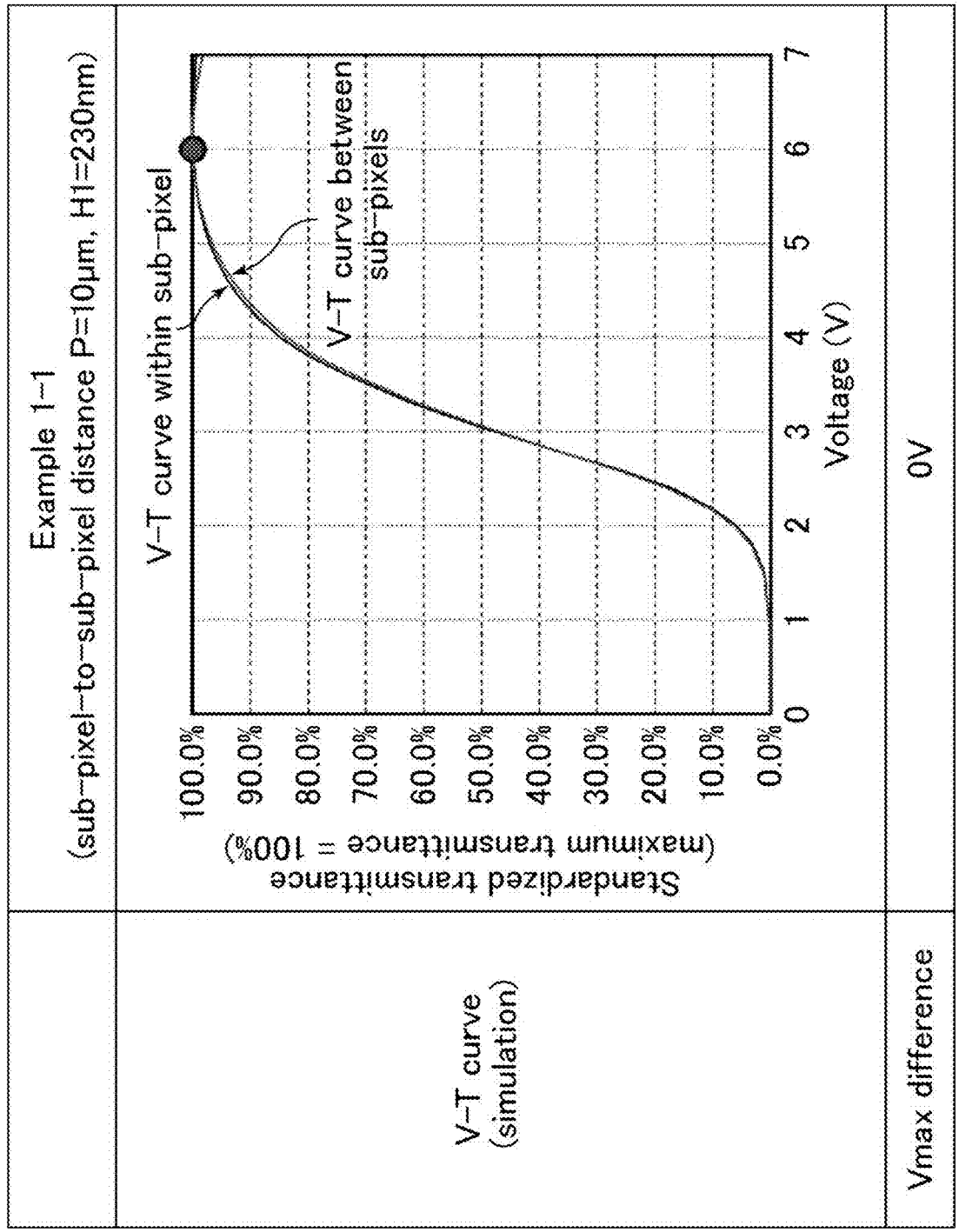
FIG. 14 is a diagram including the V-T curve of a liquid crystal display device in Example 1-1.
Figure 15:
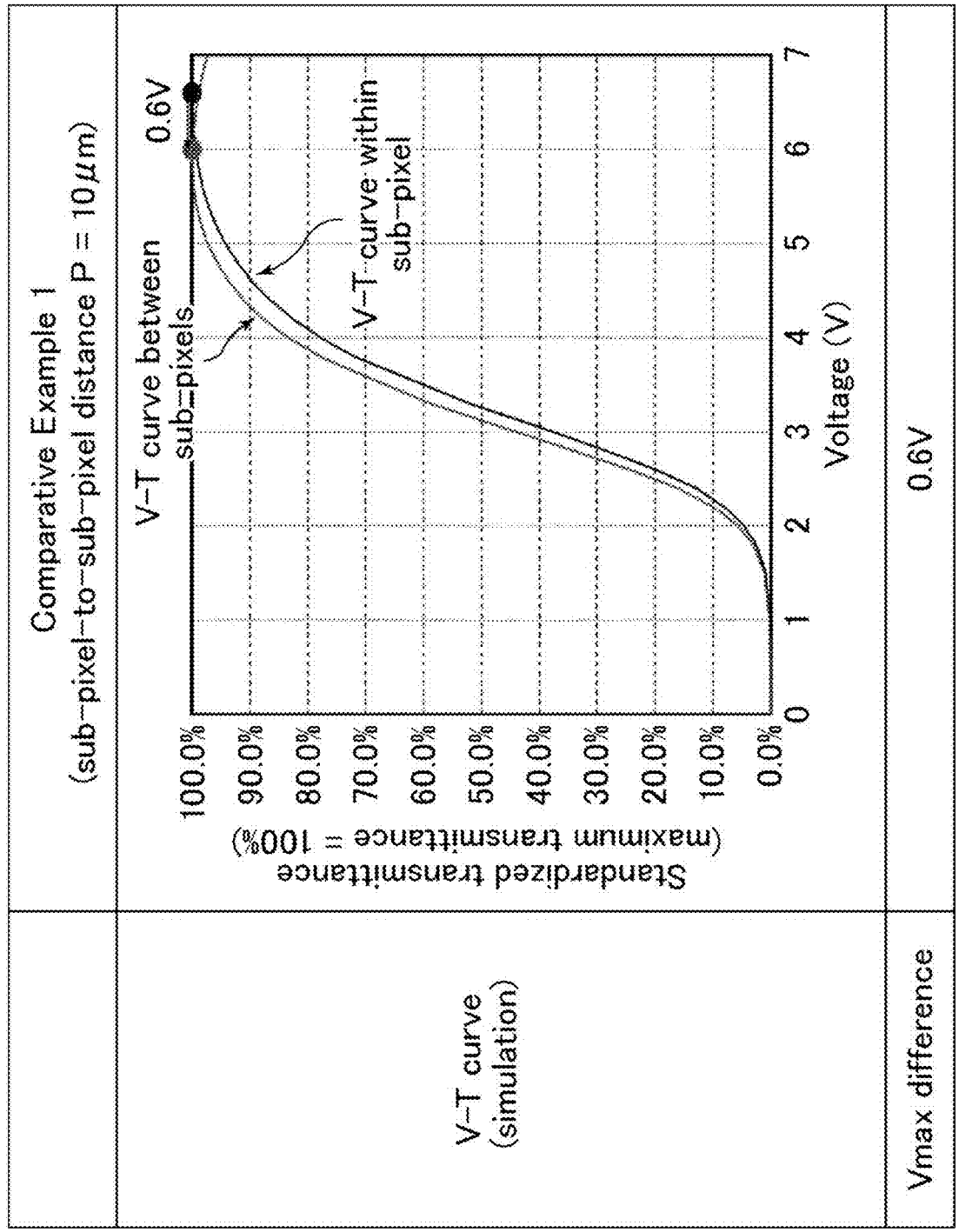
FIG. 15 is a diagram including the V-T curve of a liquid crystal display device in Comparative Example 1.

For a liquid crystal display device of Example 1-1 having the same structure as the liquid crystal display device 1 of Embodiment 1 as shown in FIG. 1, FIG. 2, and FIG. 4 and a liquid crystal display device of Comparative Example 1 having the same structure as the liquid crystal display device of Comparative Embodiment as shown in FIG. 3, the V-T curves were simulated. In Example 1-1 and Comparative Example 1, the sub-pixel-to-sub-pixel distance P was set to 10 μm, the relative permittivities of the second insulating films 150 and 150R were set to 6.9, and the Δε value of the liquid crystal layer 300 was set to −3.4. In Example 1-1, the film thickness H1 of the second insulating film 150 was set to 230 nm and the film thickness H2 of the second insulating film 150 was set to 180 nm. In Comparative Example 1, the film thickness of the second insulating film 150R was set to 180 nm. Herein, the simulation was performed using ExpertLCD (Daou Xilicon Co., Ltd.). The results are shown in FIG. 14 and FIG. 15. FIG. 14 is a diagram including the V-T curve of the liquid crystal display device in Example 1-1. FIG. 15 is a diagram including the V-T curve of the liquid crystal display device in Comparative Example 1. Herein, Vmax means the voltage at which the transmittance becomes maximum. The Vmax difference in FIG. 14 and FIG. 15 means the difference between the Vmax between sub-pixels and the Vmax within a sub-pixel.

As shown in FIG. 14, the V-T curve within a sub-pixel matched the V-T curve between sub-pixels for the liquid crystal display device of Example 1-1. This is presumably because as follows. Specifically, in the liquid crystal display device of Example 1-1, the film thickness H1 and the film thickness H2 of the second insulating film 150 are different from each other (more specifically, the film thickness H1 is greater than the film thickness H2 for each sub-pixel), which allows the electric field strength between the common electrode 140 and the linear electrode portions 160L1 at the sub-pixel edge area to be lower than the electric field strength between the common electrode 140 and the linear electrode portions 160L2 at the sub-pixel central area. This seems to give a weaker fringe electric field at the sub-pixel edge area than at the sub-pixel central area to reduce an increase in the electric field strength at the sub-pixel edge area, leading to a small difference between the electric field strength at the sub-pixel edge area and the electric field strength at the sub-pixel central area. This resultantly seems to reduce worsening of flicker after long-term display of a solid white image. In contrast, as shown in FIG. 15, the voltage is lower between sub-pixels than within a sub-pixel in the liquid crystal display device of Comparative Example 1. Thus, in the liquid crystal display device of Comparative Example 1, the difference between the electric field strength at the sub-pixel edge area and the electric field strength at the sub-pixel central area seems to be difficult to reduce, causing a failure in reducing worsening of flicker after long-term display of a solid white image.

Liquid Crystal Display Devices of Examples 1-2 to 1-6

Figure 16:
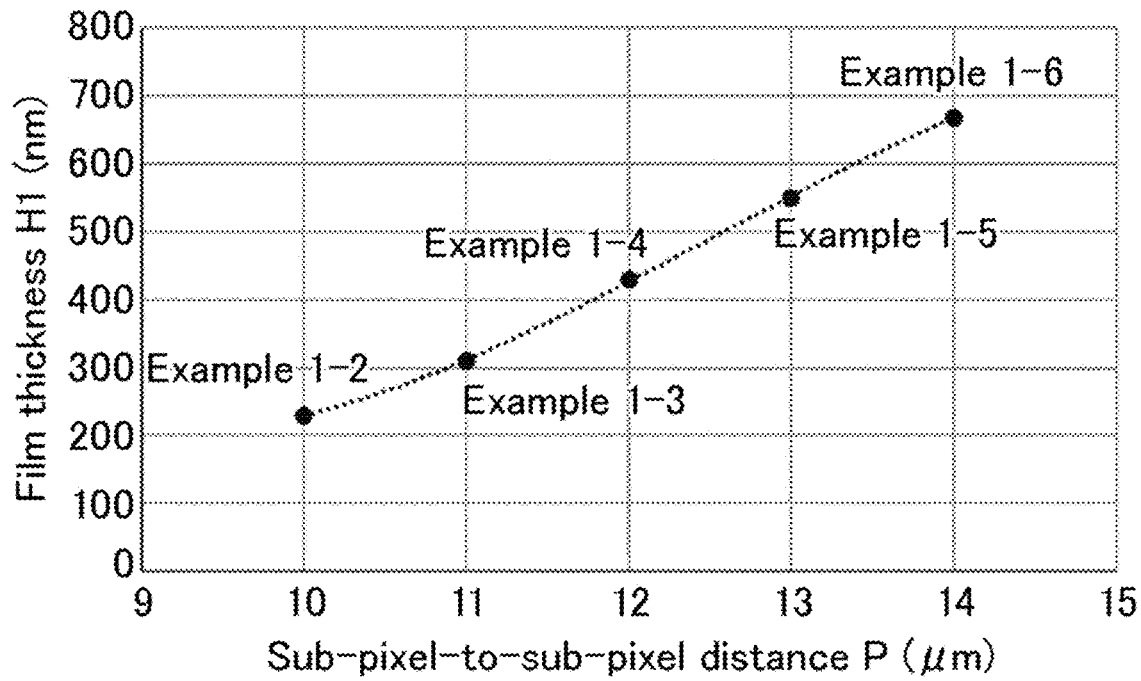
FIG. 16 is a graph of the correlation between the optimal film thickness H1 and the sub-pixel-to-sub-pixel distance P for liquid crystal display devices in Examples 1-2 to 1-6.

The Vmax difference was used as an index to explore the optimal film thickness H1 relative to the sub-pixel-to-sub-pixel distance P. Specifically, for liquid crystal display devices of Examples 1-2 to 1-6 having the same structure as in Example 1-1 except that the sub-pixel-to-sub-pixel distances P were respectively set to 10 µm, 11 µm, 12 µm, 13 µm, and 14 µm, the film thickness H1 for a Vmax difference of 0 V was simulated. The results are shown in FIG. 16. FIG. 16 is a graph of the correlation between the optimal film thickness H1 and the sub-pixel-to-sub-pixel distance P for the liquid crystal display devices in Examples 1-2 to 1-6. As shown in FIG. 16, the greater the sub-pixel-to-sub-pixel distance P is, the greater the optimal film thickness H1 is.

Figure 17:
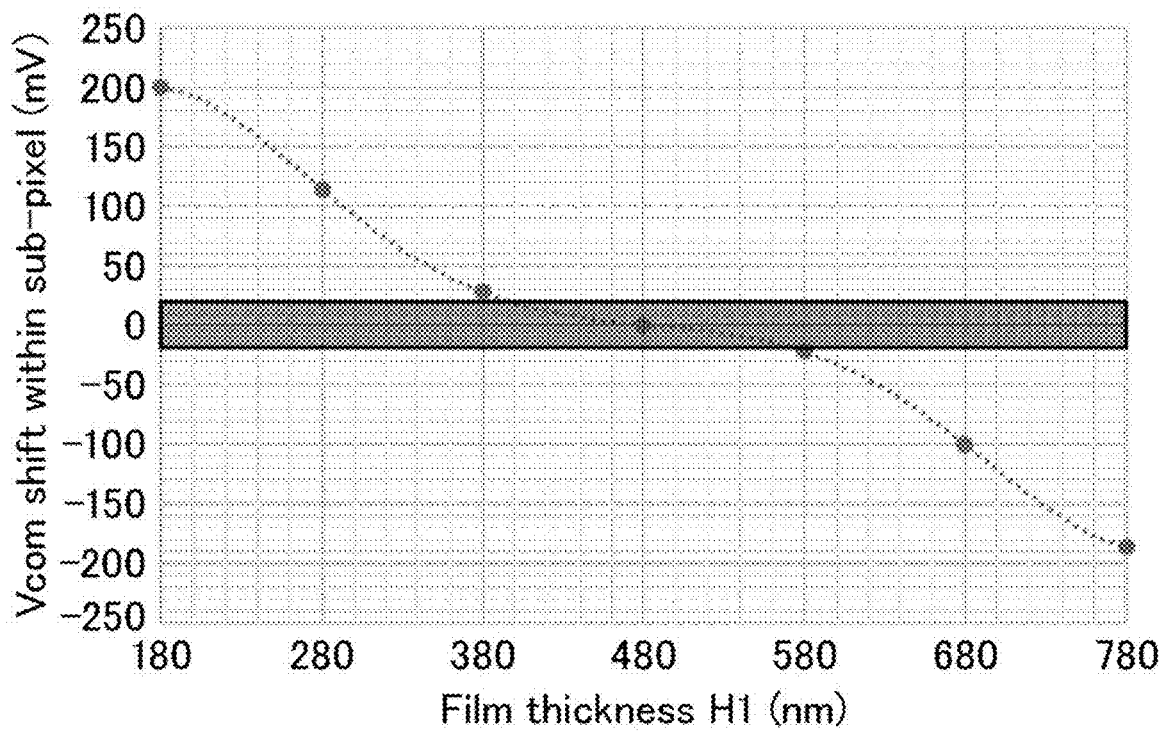
FIG. 17 is a graph of the Vcom shift in a sub-pixel relative to the film thickness H1.
Figure 18:
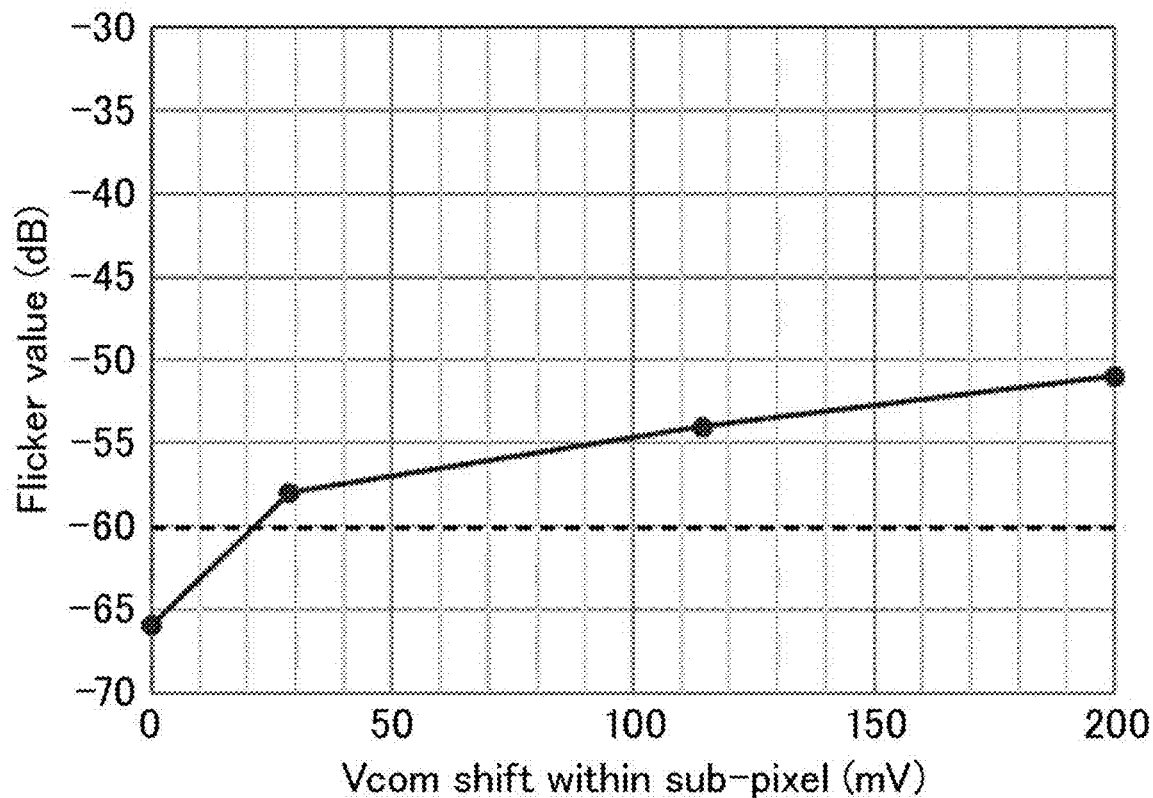
FIG. 18 is a graph of the flicker value relative to the Vcom shift in a sub-pixel.

For a liquid crystal display device having the same structure as in Example 1-1 except that the sub-pixel-to-sub-pixel distance P was changed to 12 the shift between the optimal Vcom value at the sub-pixel central area and the optimal Vcom value at the sub-pixel edge area (hereinafter, also referred to as the Vcom shift within a sub-pixel) was evaluated relative to the film thickness H1. The flicker value relative to the Vcom shift within a sub-pixel was also evaluated. The results are shown in FIG. 17 and FIG. 18. FIG. 17 is a graph of the Vcom shift in a sub-pixel relative to the film thickness H1. FIG. 18 is a graph of the flicker value relative to the Vcom shift in a sub-pixel.

Figure 19:
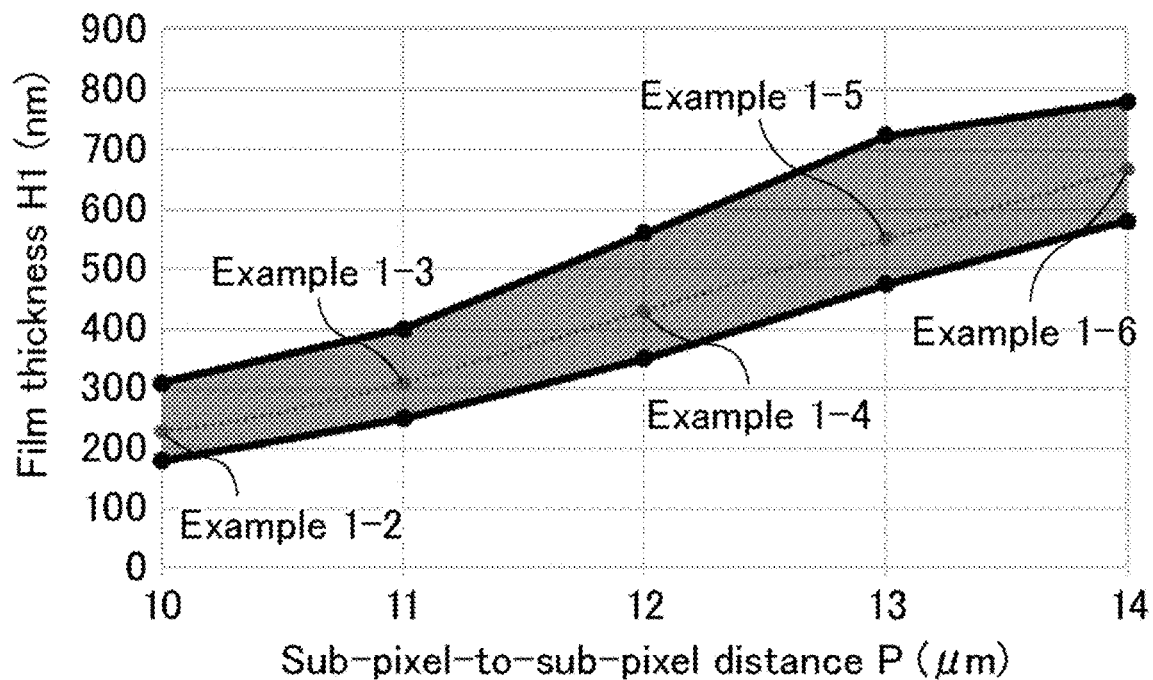
FIG. 19 is a diagram which is based on FIG. 16 and which indicates the range where the Vcom shift in a sub-pixel is within ±20 mV.

FIG. 17 demonstrates that the Vcom shift within a sub-pixel was reduced in accordance with the film thickness H1. FIG. 18 demonstrates that reduction in the Vcom shift within a sub-pixel improved the flicker. The flicker needs to be −60 dB or lower, including its margin. The conditions for a flicker value of −60 dB or lower fall within the grey hatched region in FIG. 17. The Vcom shift within a sub-pixel needs to fall within a range of ±20 mV. In the graph of FIG. 16, the range within which the Vcom shift within a sub-pixel is ±20 mV is grey hatched, which is provided as FIG. 19. FIG. 19 is a diagram which is based on FIG. 16 and which indicates the range where the Vcom shift in a sub-pixel is within ±20 mV. In FIG. 19, the difference between the lower edge of the range of the film thickness H1 in Example 1-2 expressed by grey hatch, i.e., 185 nm, and the film thickness H2=180 nm demonstrates that the difference between the film thickness H1 and the film thickness H2 is preferably 5 nm or greater. Also, in FIG. 19, the difference between the upper edge of the range of the film thickness H1 in Example 1-6 expressed by grey hatch, i.e., 780 nm, and the film thickness H2=180 nm demonstrates that the difference between the film thickness H1 and the film thickness H2 is preferably 600 nm or smaller. The dotted line in FIG. 19 demonstrates that the film thickness H1 is preferably 230 nm or greater and 670 nm or smaller.

In Examples 1-1 to 1-6, the liquid crystal layers used had a negative $\Delta\varepsilon$ value. Still, a liquid crystal layer having a positive $\Delta\varepsilon$ value seems to achieve similar effects.

Evaluation of Contrast Ratio of Liquid Crystal Display Devices in Examples 1-1 and 2 to 4 and Comparative Example 1

For the liquid crystal display device of Example 1-1, a liquid crystal display device of Example 2 having the same structure as in Embodiment 2, a liquid crystal display device of Example 3 having the same structure as in Embodiment 3, a liquid crystal display device of Example 4 having the same structure as in Embodiment 4, and the liquid crystal display device of Comparative Example 1, the black luminance, white luminance, and contrast ratio (CR) were determined. The black luminance and the white luminance were determined by placing a liquid crystal panel 10 including a first linear polarizer and a second linear polarizer on a backlight 20, applying a black state voltage (0 V) and a white state voltage (e.g., 5 V) to the liquid crystal panel 10, and measuring the luminances at the respective states using a luminance meter (SR-UL1, Topcon Technohouse Corp.). The contrast ratio was determined by dividing the white luminance by the black luminance. The results are shown in Table 1.

TABLE 1

|  | Comparative Example 1 | Example 1-1 | Example 2 | Example 3 | Example 4 |
| --- | --- | --- | --- | --- | --- |
| Black luminance | 0.23 nit | 0.33 nit | 0.30 nit | 0.37 nit | 0.24 nit |
| White luminance | 400 nit | 400 nit | 400 nit | 400 nit | 400 nit |
| CR | 1740 | 1212 | 1333 | 1081 | 1666 |

As shown in Table 1, the liquid crystal display device of Example 4 exhibited less worsening of the contrast ratio than the liquid crystal display devices of Examples 1-1, 2, and 3, achieving a contrast ratio comparable to that in Comparative Example 1. In the liquid crystal display devices of Examples 1-1, 2, and 3, the step portions in the second insulating film 150 impairs the flatness of the surface of the first substrate 100 close to the liquid crystal layer 300. This seems to cause a higher black luminance and a lower contrast ratio. In contrast, the liquid crystal display device of Example 4 can achieve an effect of reducing worsening of flicker after long-term display of a solid white image as in the case of the liquid crystal display devices of Examples 1-1, 2, and 3, while achieving the flatness of the surface of the first substrate 100 close to the liquid crystal layer 300 at a level comparable to that in Comparative Example 1. This seems to reduce worsening of the contrast ratio.

Liquid Crystal Display Device of Example 5-1

Figure 20:
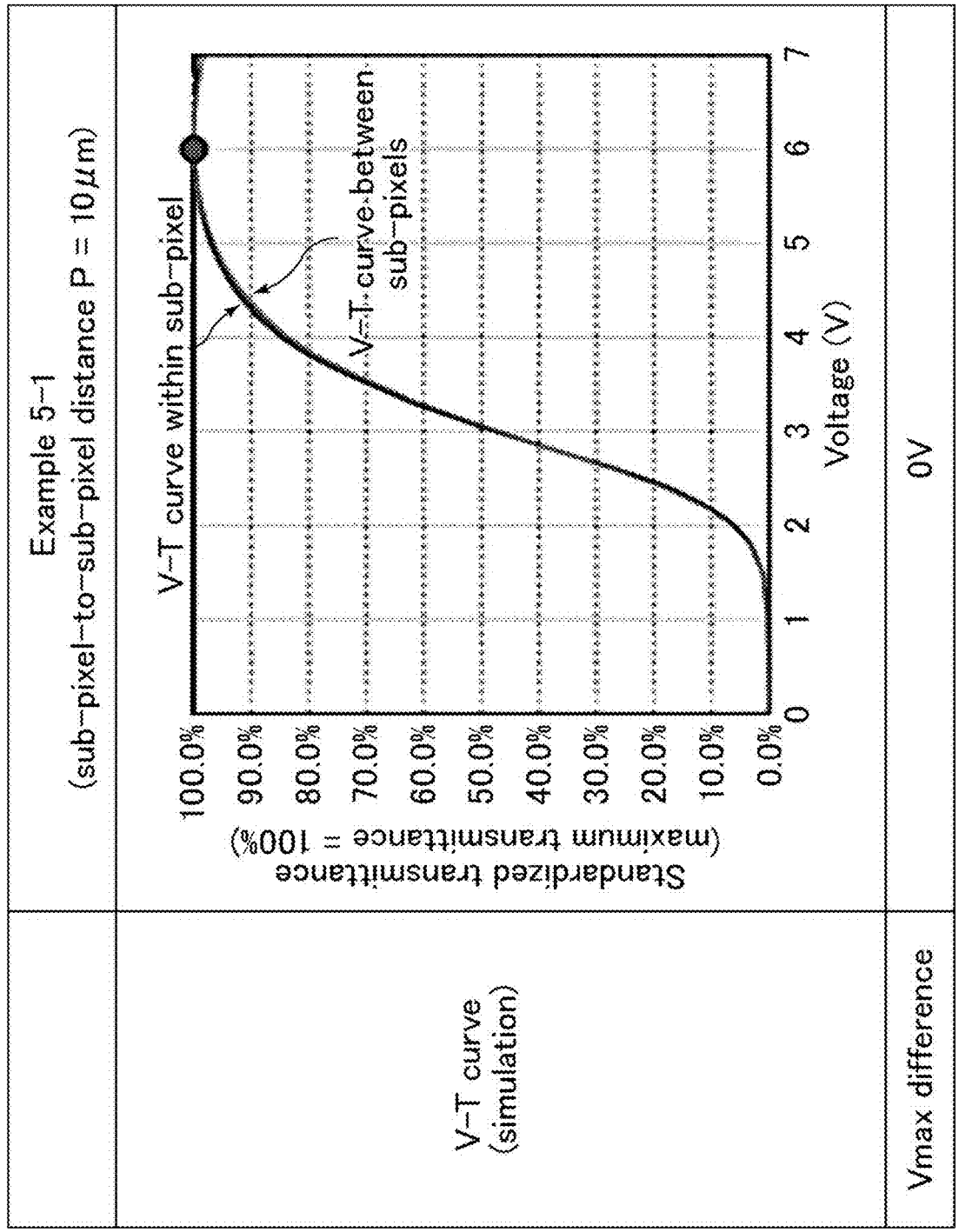
FIG. 20 is a diagram including the V-T curve of a liquid crystal display device in Example 5-1.

For a liquid crystal display device of Example 5-1 having the same structure as in Embodiment 5, the V-T curve was simulated. In Example 5-1, the sub-pixel-to-sub-pixel distance P was set to 10 µm, the relative permittivity of the first dielectric insulating film 150A was set to 6.9, the relative permittivity of the second dielectric insulating film 150B was set to 6.1, and the $\Delta\varepsilon$ value of the liquid crystal layer was set to −3.4. The results are shown in FIG. 20. FIG. 20 is a diagram including the V-T curve of the liquid crystal display device in Example 5-1. Herein, the first dielectric insulating film is also referred to as a high-dielectric insulating film and the second dielectric insulating film is also referred to as a low-dielectric insulating film.

As described above and as shown in FIG. 15, the voltage is lower between sub-pixels than within a sub-pixel in the liquid crystal display device of Comparative Example 1. In contrast, as shown in FIG. 20, the V-T curve within a sub-pixel matched the V-T curve between sub-pixels in Example 5-1. This is presumably because as follows. Specifically, in the liquid crystal display device of Example 5-1, the second insulating film 150 has different relative permittivities within the region overlapping the linear electrode portions 160L1 at the sub-pixel edge area and within the region overlapping the linear electrode portions 160L2 at the sub-pixel central area (more specifically, the second insulating film 150 is composed of the first dielectric insulating film 150A and the second dielectric insulating film 150B), which allows the electric field strength between the common electrode 140 and the linear electrode portions 160L1 at the sub-pixel edge area to be lower than the electric field strength between the common electrode 140 and the linear electrode portions 160L2 at the sub-pixel central area. This seems to give a weaker fringe electric field at the sub-pixel edge area than at the sub-pixel central area to reduce an increase in the electric field strength at the sub-pixel edge area, leading to a small difference between the electric field strength at the sub-pixel edge area and the electric field strength at the sub-pixel central area. This resultantly seems to reduce worsening of flicker after long-term display of a solid white image.

Liquid Crystal Display Devices of Examples 5-2 to 5-6

Figure 21:
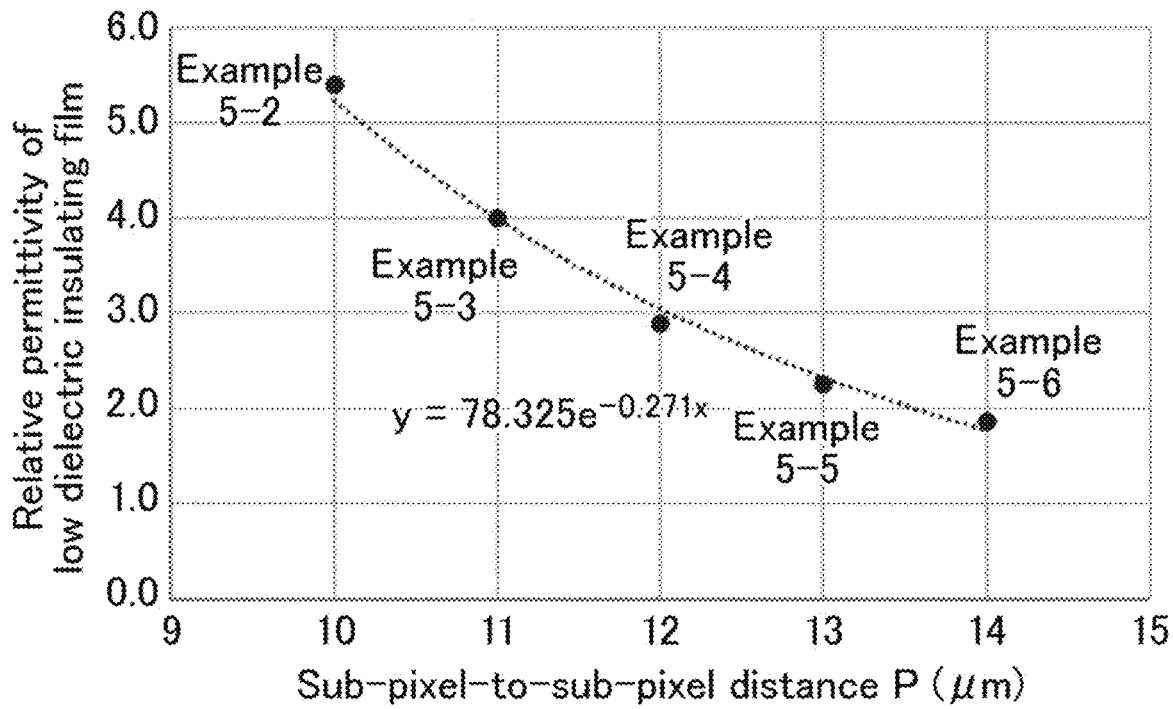
FIG. 21 is a graph of the correlation between the optimal relative permittivity of a low-dielectric insulating film and the sub-pixel-to-sub-pixel distance P of liquid crystal display devices in Examples 5-2 to 5-6.

The Vmax difference was used as an index to explore the optimal film thickness H1 relative to the sub-pixel-to-sub-pixel distance P. Specifically, for liquid crystal display devices of Examples 5-2 to 5-6 having the same structure as in Example 5-1 except that the sub-pixel-to-sub-pixel distances P were respectively set to 10 μm, 11 μm, 12 μm, 13 μm, and 14 μm, the relative permittivity of the second dielectric insulating film 150B (low-dielectric insulating film) for a Vmax difference of 0 V was simulated. The results are shown in FIG. 21. FIG. 21 is a graph of the correlation between the optimal relative permittivity of a low-dielectric insulating film and the sub-pixel-to-sub-pixel distance P of the liquid crystal display devices in Examples 5-2 to 5-6. As shown in FIG. 21, the greater the sub-pixel-to-sub-pixel distance P is, the smaller the optimal relative permittivity of the low-dielectric insulating film is.

Figure 22:
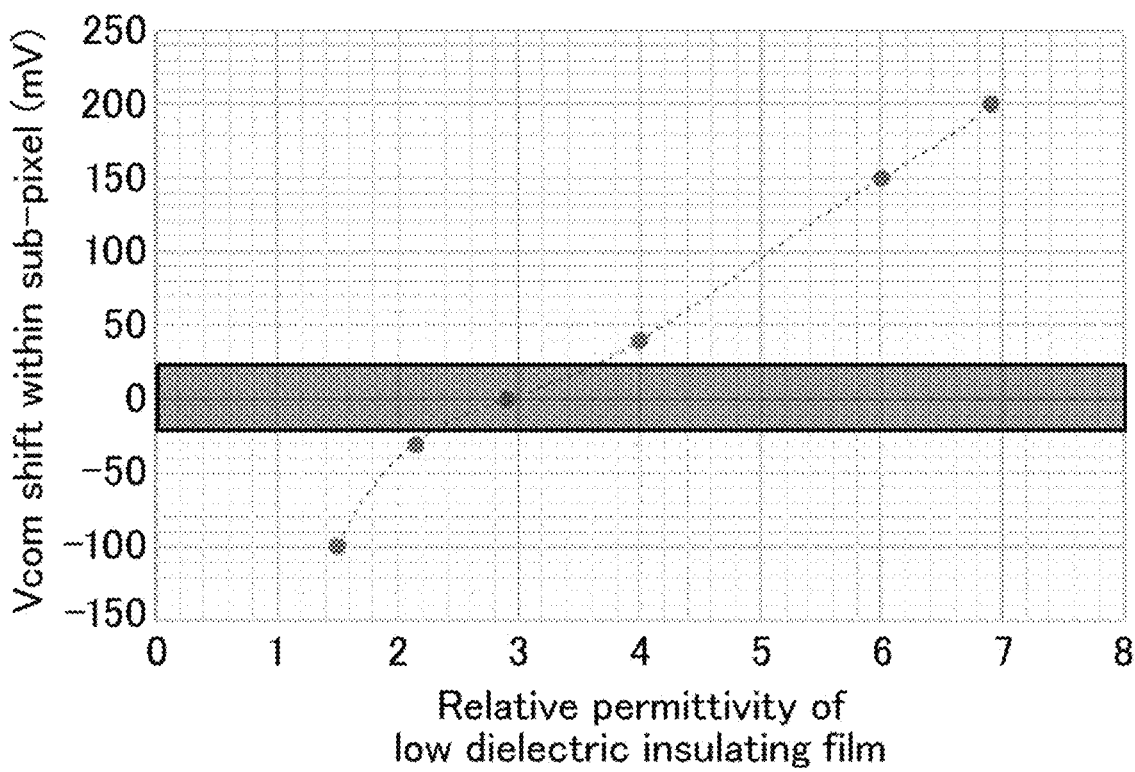
FIG. 22 is a graph of the Vcom shift in a sub-pixel relative to the relative permittivity of the low-dielectric insulating film.

For a liquid crystal display device having the same structure as in Example 5-1 except that the sub-pixel-to-sub-pixel distance P was changed to 12 the Vcom shift within a sub-pixel was evaluated relative to the relative permittivity of the low-dielectric insulating film. The flicker value relative to the Vcom shift within a sub-pixel was also evaluated. The results are shown in FIG. 22. FIG. 22 is a graph of the Vcom shift in a sub-pixel relative to the relative permittivity of the low-dielectric insulating film.

Figure 23:
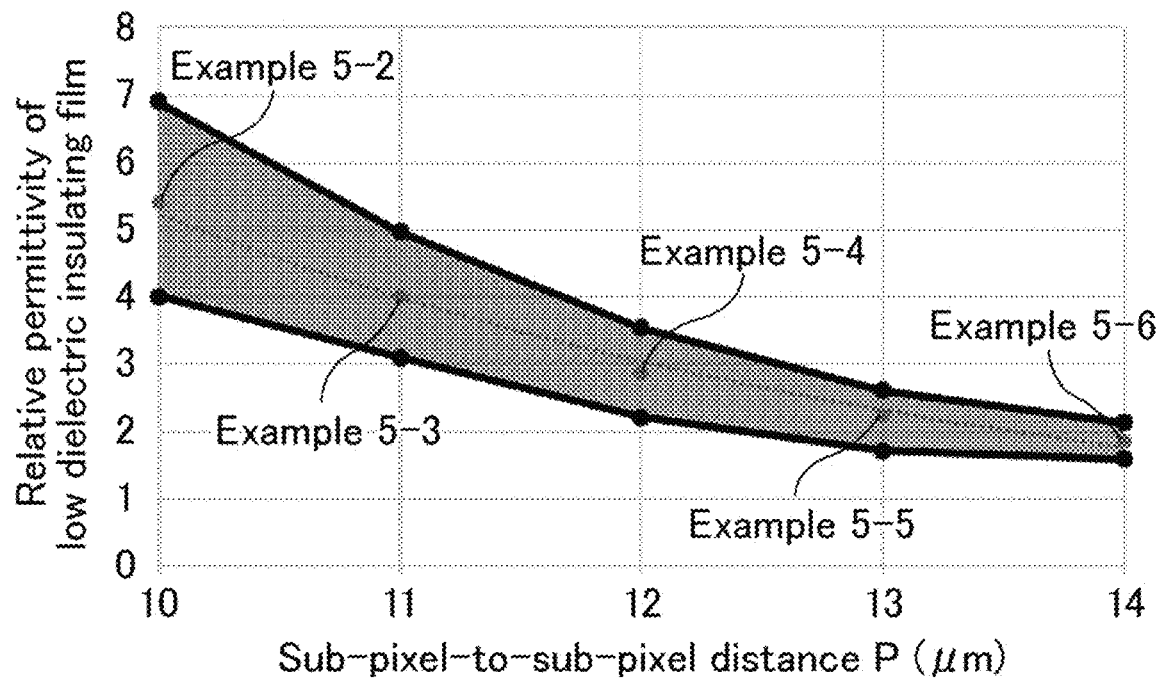
FIG. 23 is a diagram which is based on FIG. 21 and which indicates the range where the Vcom shift in a sub-pixel is within ±20 mV.

FIG. 22 demonstrates that the Vcom shift within a sub-pixel was reduced in accordance with the relative permittivity of the low-dielectric insulating film. Also, as described above, FIG. 18 demonstrates that reduction in the Vcom shift within a sub-pixel improved the flicker. The flicker needs to be −60 dB or lower, including its margin. The conditions for a flicker value of −60 dB or lower fall within the grey hatched region in FIG. 22. The Vcom shift within a sub-pixel needs to fall within a range of ±20 mV. In the graph of FIG. 21, the range within which the Vcom shift within a sub-pixel is ±20 mV is grey hatched, which is provided as FIG. 23. FIG. 23 is a diagram which is based on FIG. 21 and which indicates the range where the Vcom shift in a sub-pixel is within ±20 mV.

In Examples 5-1 to 5-6, the liquid crystal layers used had a negative Δε value. Still, a liquid crystal layer having a positive Δε value seems to achieve similar effects.

Evaluation of Contrast Ratio of Liquid Crystal Display Devices in Examples 1-1, 2 to 4, and 5-1 and Comparative Example 1

For the liquid crystal display devices of Examples 1-1, 2 to 4, and 5-1 and Comparative Example 1, the black luminance, white luminance, and contrast ratio (CR) were determined. The results are shown in Table 2.

TABLE 2

|  | Comparative Example 1 | Example 1-1 | Example 2 | Example 3 | Example 4 |
| --- | --- | --- | --- | --- | --- |
| Black luminance | 0.23 nit | 0.33 nit | 0.30 nit | 0.37 nit | 0.23 nit |
| Whtie luminance | 400 nit | 400 nit | 400 nit | 400 nit | 400 nit |
| CR | 1740 | 1212 | 1333 | 1081 | 1740 |

As shown in Table 2, similarly to the liquid crystal display device of Example 4, the liquid crystal display device of Example 5-1 also exhibited less worsening of the contrast ratio than the liquid crystal display devices of Examples 1-1, 2, and 3, achieving a contrast ratio comparable to that in Comparative Example 1. The liquid crystal display device of Example 5-1 can also achieve an effect of reducing worsening of flicker after long-term display of a solid white image as in the case of the liquid crystal display device of Example 4, while achieving the flatness of the surface of the first substrate 100 close to the liquid crystal layer 300 at a level comparable to that in Comparative Example 1. This seems to reduce worsening of the contrast ratio.

Discussion on Formula 1 Based on Liquid Crystal Display Devices of Examples 1-1 and 5-1

Figure 24:
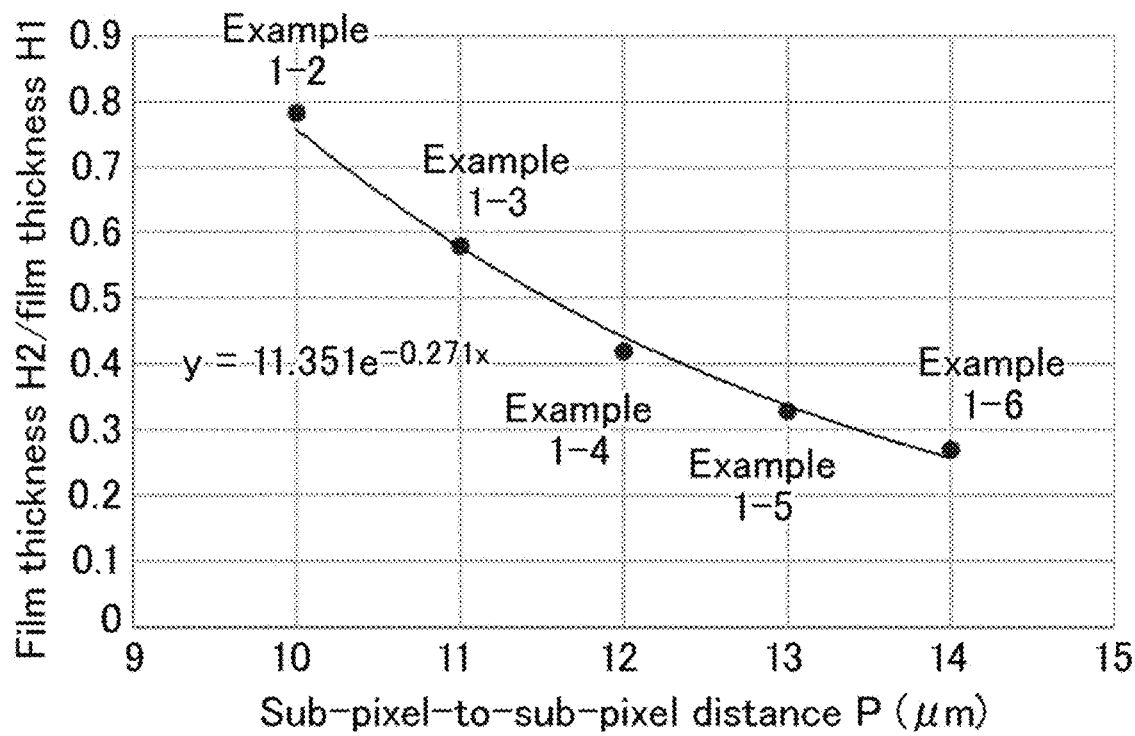
FIG. 24 is a diagram which is based on FIG. 16 and in which the vertical axis is converted to (film thickness H2)/(film thickness H1).
Figure 25:
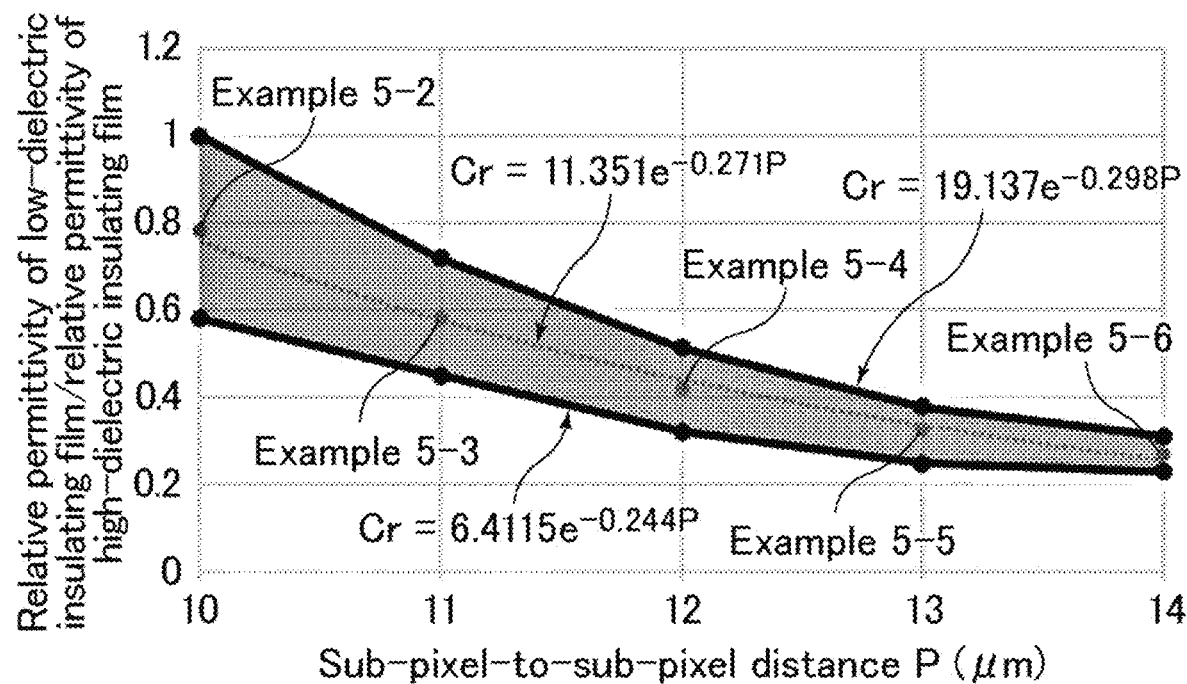
FIG. 25 is a diagram which is based on FIG. 21 and in which the vertical axis is converted to (relative permittivity of low-dielectric insulating film)/(relative permittivity of high-dielectric insulating film).
Figure 26:
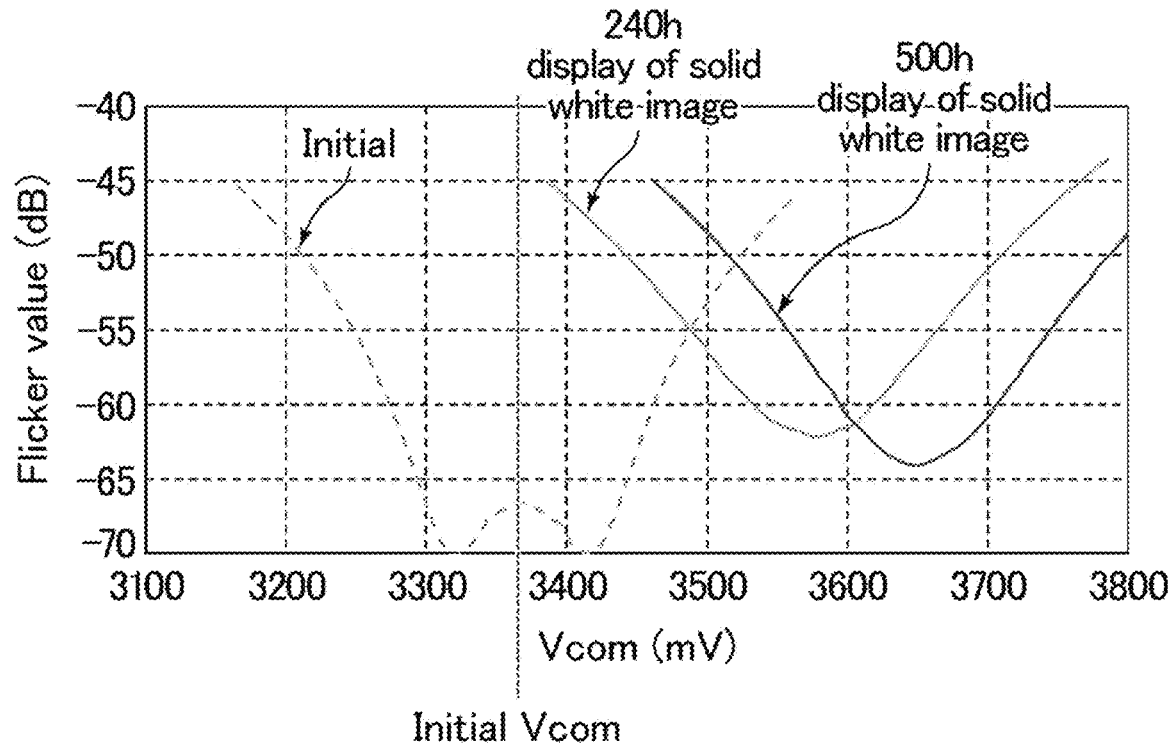
FIG. 26 is a graph of the results of measuring the flicker after a conventional FFS V2 mode liquid crystal display device displays a solid white image for a long period of time.
Figure 27:
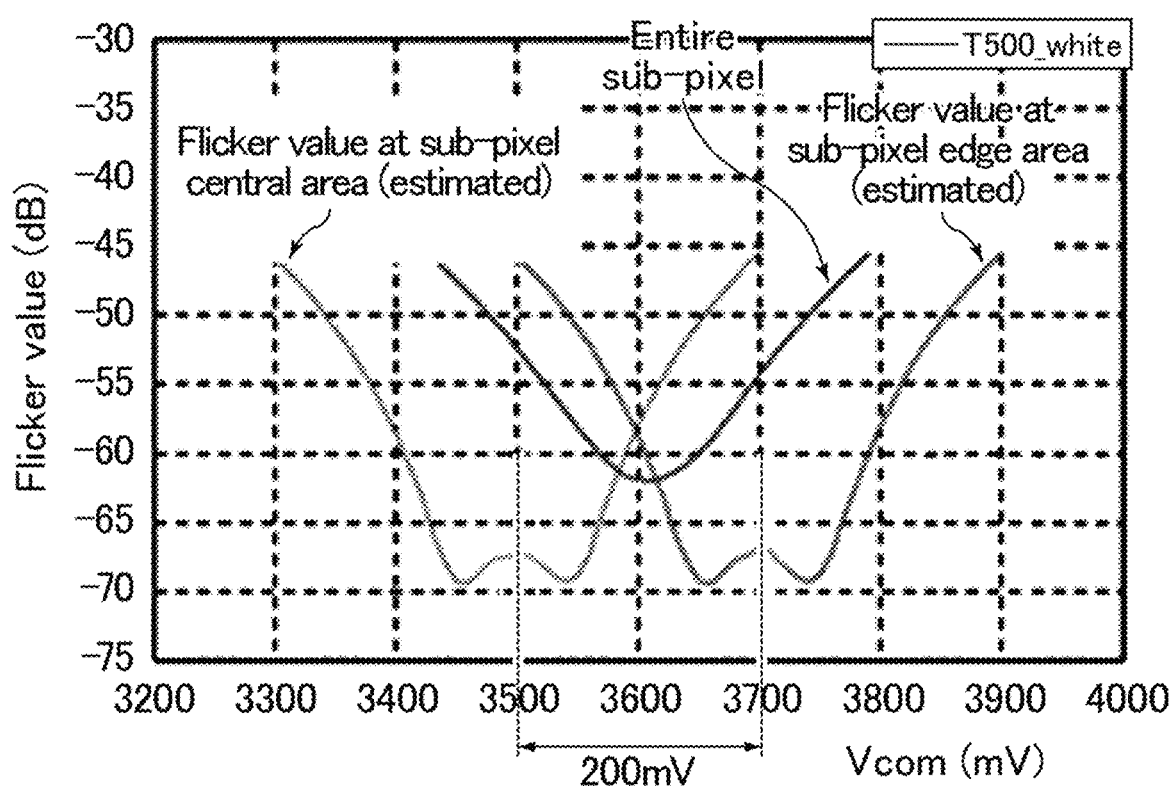
FIG. 27 is a graph of the results of measuring the flicker in the entire sub-pixel and the results of estimating the flicker at a sub-pixel central area and a sub-pixel edge area after a conventional FFS V2 mode liquid crystal display device displays a solid white image for a long period of time.

Based on the results of Example 1-1 and Example 5-1, the present inventors considered that the sub-pixel-to-sub-pixel distance P and the ratio Cr of the capacitance between sub-pixels to the capacitance within a sub-pixel are important to reduce worsening of flicker after long-term display of a solid white image. Thus, for Example 1-1, they examined FIG. 24, which is based on FIG. 16 and in which the vertical axis is converted to (film thickness H2)/(film thickness H1)=180 nm/H1. FIG. 24 is a diagram which is based on FIG. 16 and in which the vertical axis is converted to (film thickness H2)/(film thickness H1). For Example 5-1, they examined FIG. 25, which is based on FIG. 21 and in which the vertical axis is converted to (relative permittivity of low-dielectric insulating film)/(relative permittivity of high-dielectric insulating film)=(relative permittivity of low-dielectric insulating film)/6.9. FIG. 25 is a diagram which is based on FIG. 21 and in which the vertical axis is converted to (relative permittivity of low-dielectric insulating film)/(relative permittivity of high-dielectric insulating film).

For each of the graphs of FIG. 24 and FIG. 25, an approximate curve was drawn based on the calculated capacitance of parallel conductors. The approximate curves of both matched to each other and the approximate curve of the following Formula 1-1-1 was calculated for each case.

$$y=11.351e^{-0.271x} \quad \text{(Formula 1-1-1)}$$

The capacitance C [F] of a plate capacitor is expressed by C=(ε/d)×S, wherein represents the relative permittivity of a dielectric, d [m] represents the distance between the pole plates, and S [m²] represents the pole plate area. Thus, the tendency of the capacitance C can be obtained without considering the pole area S. This reveals that the vertical axes in FIG. 24 and FIG. 25 each can be regarded as the ratio Cr of the capacitance between sub-pixels to the capacitance within a sub-pixel (=(capacitance between sub-pixels)/(capacitance within a sub-pixel)) without considering the area, i.e., the ratio Cr of the capacitance between sub-pixels to the capacitance within a sub-pixel after standardization of the area. Accordingly, satisfying the following Formula 1-1 can sufficiently give an effect of reducing worsening of flicker after long-term display of a solid white image.

$$Cr=11.351e^{-0.271P} \quad \text{(Formula 1-1)}$$

In consideration of the margin as in the case of FIG. 19 and FIG. 23, the grey hatched region in FIG. 25 can provide an effect of reducing worsening of flicker after long-term display of a solid white image while the Vcom shift within a sub-pixel is within ±20 mV. The vertical axis y in FIG. 25 shows the ratio Cr of the capacitance between sub-pixels to the capacitance within a sub-pixel, while the horizontal axis x shows the sub-pixel-to-sub-pixel distance P. Thus, in FIG. 25, the grey hatched region satisfies the following Formula 1.

$$6.4115e^{-0.244P}<Cr<19.137e^{-0.298P} \quad \text{(Formula 1)}$$

The above experiments consequently demonstrate that the ratio Cr of the capacitance between sub-pixels to the capacitance within a sub-pixel and the sub-pixel-to-sub-pixel distance P satisfying the above Formula 1 can lead to an effect of effectively reducing worsening of flicker after long-term display of a solid white image and those satisfying the above Formula 1-1 can more effectively reduce the worsening of flicker.

REFERENCE SIGNS LIST

1: liquid crystal display device
1PX, 11PX, 12PX: sub-pixel
1PXA, 11PXA, 12PXA: optical aperture
10: liquid crystal panel
20: backlight
100: first substrate
110, 210: support substrate
120G: gate line
120S: source line
130, 150, 150R: insulating film
140: common electrode
150A, 150B: dielectric insulating film
150S, 150T, 150U: step portion
160, 1601, 1602: sub-pixel electrode
160L, 160L1, 160L2: linear electrode portion
160S: slit
200: second substrate
220: black matrix layer
230: color filter layer
230B: blue color filter
230G: green color filter
230R: red color filter
240: overcoat layer
300: liquid crystal layer
410, 420: alignment film
1601X, 1602X: end portion
H1, H2, H11, H12: film thickness
P: sub-pixel-to-sub-pixel distance

What is claimed is:

1. A liquid crystal display device comprising a first sub-pixel and a second sub-pixel adjacent to each other and sequentially comprising:
    a first substrate;
    a liquid crystal layer; and
    a second substrate,
    the first substrate sequentially including a planar common electrode, an interlayer insulating film, and a first sub-pixel electrode and a second sub-pixel electrode respectively provided for the first sub-pixel and the second sub-pixel,
    the first sub-pixel electrode and the second sub-pixel electrode each provided with slits and each including a plurality of linear electrode portions extending in a direction in which the slits extend,
    the plurality of linear electrode portions including linear electrode portions at a sub-pixel edge area provided at respective end portions and a linear electrode portion at a sub-pixel central area provided between the linear electrode portions at the sub-pixel edge area,
    the interlayer insulating film including a region overlapping the linear electrode portions at the sub-pixel edge area and a region overlapping the linear electrode portion at the sub-pixel central area for each sub-pixel, the regions being different in at least one of a film thickness or a relative permittivity,
    an electric field strength between the common electrode and the linear electrode portions at the sub-pixel edge area being lower than an electric field strength between the common electrode and the linear electrode portion at the sub-pixel central area.

2. The liquid crystal display device according to claim 1, wherein the liquid crystal display device satisfies the following Formula 1:

$$6.4115e^{-0.244P}<Cr<19.137e^{-0.298P} \quad \text{(Formula 1)}$$

wherein P represents a sub-pixel-to-sub-pixel distance between an end portion of the plurality of linear electrode portions of the first sub-pixel electrode close to the second sub-pixel electrode and an end portion of the plurality of linear electrode portions of the second sub-pixel electrode close to the first sub-pixel electrode; and Cr represents a ratio of a capacitance between the first sub-pixel and the second sub-pixel to a capacitance in the first sub-pixel.

3. The liquid crystal display device according to claim 1, wherein the interlayer insulating film has a film thickness H1 within the region overlapping the linear electrode portions at the sub-pixel edge area and a film thickness H2 within the region overlapping the linear electrode portion at the sub-pixel central area for each sub-pixel, and the film thickness H1 is greater than the film thickness H2.

4. The liquid crystal display device according to claim 3, wherein the interlayer insulating film includes step portions each between the region having the film thickness H1 and the region having the film thickness H2 for each sub-pixel, and in a cross-sectional view, the step portions are vertical to a bottom surface of the interlayer insulating film, and the linear electrode portions at the sub-pixel edge area each define a single plane with the corresponding step portion.

5. The liquid crystal display device according to claim 3, wherein the interlayer insulating film includes step portions each between the region having the film thickness H1 and the region having the film thickness H2 for each sub-pixel, and in a cross-sectional view, the step portions are diagonal to a bottom surface of the interlayer insulating film, and the linear electrode portions at the sub-pixel edge area each do not define a single plane with the corresponding step portion.

6. The liquid crystal display device according to claim 3, wherein the interlayer insulating film includes step portions each between the region having the film thickness H1 and the region having the film thickness H2 for each sub-pixel, and in a cross-sectional view, the step portions are vertical to a bottom surface of the interlayer insulating film, and the linear electrode portions at the sub-pixel edge area each do not define a single plane with the corresponding step portion.

7. The liquid crystal display device according to claim 3, wherein the interlayer insulating film is a first interlayer insulating film, a second interlayer insulating film is further provided on the common electrode opposite to the first interlayer insulating film, a film thickness of the second interlayer insulating film within the region overlapping the linear electrode portions at the sub-pixel edge area is smaller than a film thickness of the second interlayer insulating film within the region overlapping the linear electrode portion at the sub-pixel central area for each sub-pixel, and the linear electrode portions at the sub-pixel edge area and the linear electrode portion at the sub-pixel central area are provided on the same plane.

8. The liquid crystal display device according to claim 1, wherein the interlayer insulating film includes a first dielectric insulating film within the region overlapping the linear electrode portion at the sub-pixel central area and a second dielectric insulating film within the region overlapping the linear electrode portions at the sub-pixel edge area, the second dielectric insulating film having a smaller relative permittivity than the first dielectric insulating film for each sub-pixel, and the first dielectric insulating film and the second dielectric insulating film have the same film thickness.

* * * * *